(12) United States Patent  (10) Patent No.: US 7,778,770 B2
Sakagami et al.  (45) Date of Patent: Aug. 17, 2010

(54) COMMUNICATION SYSTEM BETWEEN VEHICLES

(75) Inventors: Yoshiaki Sakagami, Wako (JP); Takamichi Shimada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1203 days.

(21) Appl. No.: 11/365,914

(22) Filed: Mar. 2, 2006

(65) Prior Publication Data

US 2006/0224301 A1    Oct. 5, 2006

(30) Foreign Application Priority Data

| Mar. 31, 2005 | (JP) | ............................. 2005-105448 |
| Mar. 31, 2005 | (JP) | ............................. 2005-105449 |
| Mar. 31, 2005 | (JP) | ............................. 2005-105450 |
| Mar. 31, 2005 | (JP) | ............................. 2005-105451 |

(51) Int. Cl.
*G01C 21/00* (2006.01)

(52) U.S. Cl. ........................ 701/200; 701/223; 701/300; 340/993

(58) Field of Classification Search .................. 701/36, 701/200–213, 223, 300; 340/989, 993
See application file for complete search history.

(56) References Cited

U.S. PATENT DOCUMENTS 7,610,146 B2 * 10/2009 Breed .......................... 701/207

FOREIGN PATENT DOCUMENTS

| JP | 06-044498 | 2/1994 |
| JP | 2000-046574 | 2/2000 |
| JP | 2000-242898 | 9/2000 |
| JP | 2001-101566 | 4/2001 |
| JP | 2001-283381 | 10/2001 |
| JP | 2003-006797 | 1/2003 |
| JP | 2004-046426 A | 2/2004 |
| JP | 2004-051006 A | 2/2004 |
| JP | 2004-103018 A | 4/2004 |
| JP | 2004-118418 A | 4/2004 |
| JP | 2004-171153 | 6/2004 |
| JP | 2004-185015 A | 7/2004 |
| JP | 2005-032010 | 2/2005 |

OTHER PUBLICATIONS

Korean Office Communication dated May 27, 2008.

* cited by examiner

*Primary Examiner*—Richard M. Camby
(74) *Attorney, Agent, or Firm*—Squire, Sanders & Dempsey, LLP

(57) ABSTRACT

A communication system between vehicles of the present invention is equipped in each of the vehicles with an image taking device for taking an image around the vehicle; a moving body detection unit for detecting a moving body from the image taken by the image taking device; a display unit for displaying the image; an image data generation unit for generating image data output to the display unit of the each vehicle; and a transmitting/receiving device for any of transmitting/receiving data, wherein the image data generation unit generates image data for displaying an existence of a moving body, of which an image is taken by said image taking device of one of the vehicles, and outputs the image data to the display unit of other vehicle.

54 Claims, 28 Drawing Sheets

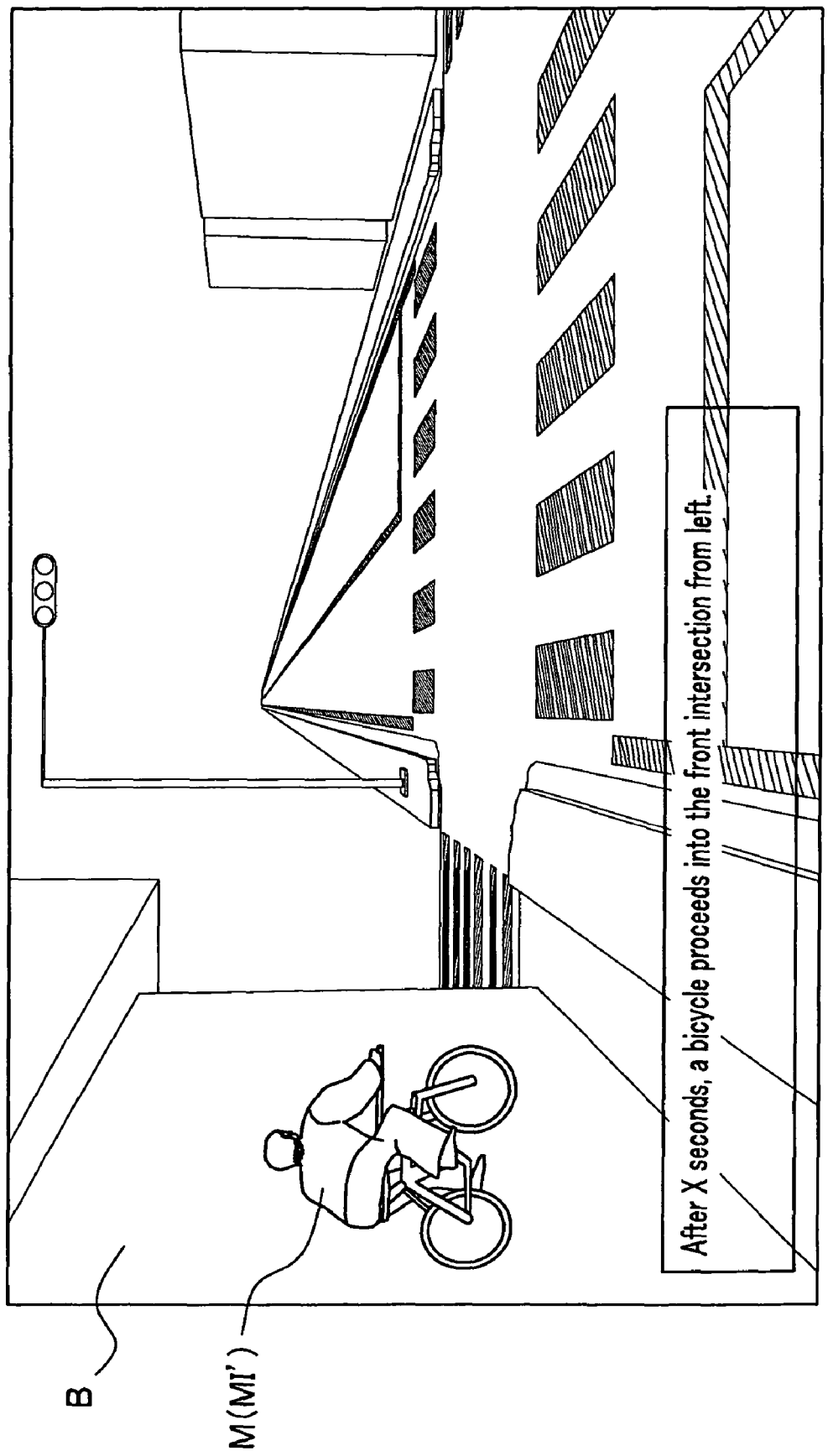

COMMUNICATION SYSTEM BETWEEN VEHICLES

BACKGROUND OF THE INVENTION

1. Field of the Invention

The present invention relates to a communication system between vehicles for communicating with each other.

2. Description of the Related Art

Conventionally, an apparatus is known that uses such a car navigation system and outputs such a road state in a display device and a voice output device provided within a vehicle.

An accident prevention apparatus at an intersection described in Japanese Patent Laid-Open Publication No. 2004-51006 (paragraphs 0015 to 0034 and FIGS. 1 to 4) is an apparatus that comprises a camera and a display unit and displays in the display unit an image in the vicinity of the intersection past taken by the camera of own vehicle when the own vehicle proceeds into the intersection.

In addition, an obstacle annunciation apparatus described in Japanese Patent Laid-Open Publication No. 2004-185015 (paragraphs 0010-0034 and FIGS. 1 to 7) is an apparatus that comprises an infrared camera and a spot lamp, detects an obstacle (moving body) from an image taken by the infrared camera of own vehicle, and notifies a driver of the obstacle by the spot lamp's radiating a magnetic wave marker at the detected obstacle.

In addition, a moving body approach annunciation apparatus described in Japanese Patent Laid-Open Publication No. 2004-118418 (paragraphs 0008 to 0029 and FIGS. 1 to 6) is an apparatus that comprises a moving body detection device for detecting a moving body in the vicinity of own vehicle and an annunciation device and estimates paths of the own vehicle and the detected moving body, wherein when these approach each other, the annunciation device notifies a driver of the approach.

However, each apparatus described in the patent documents assume that own vehicle detects a moving body, and there is a problem that the apparatus cannot notify a driver of information with respect to the moving body not enabled to have been detected by the own vehicle.

Consequently, a communication system between vehicles is strongly requested that can notify a driver of an existence of a moving body not enabled to have been detected by own vehicle.

SUMMARY OF THE INVENTION

A first aspect of the present invention is a communication system between vehicles that communicate with each other, and in each of the vehicles the system comprises an image taking device for taking an image around the vehicle; a moving body detection unit for detecting a moving body from the image taken by the image taking device; a display unit for displaying the image; an image data generation unit for generating image data output to the display unit of the vehicle; and a transmitting/receiving device for any of transmitting/receiving data, wherein the image data generation unit generates image data for displaying an existence of a moving body, of which an image is taken by said image taking device of one of the vehicles, and outputs the image data to the display unit of other vehicle.

Thus it is enabled to display in a display unit an existence of a moving body that cannot be taken by an image taking device of a certain vehicle and to inform a driver of the existence of such a moving body.

In addition, a second aspect of the present invention is the communication system of the first aspect that further comprises a vehicle position detection device for detecting vehicle position data with respect to the vehicle; and a moving body position data generation unit for generating moving body position data with respect to a position of the moving body from an image taken by the image taking device, wherein the transmitting/receiving device of one vehicle receives the moving body position data generated by the moving body position data generation unit of other vehicle, and wherein based on the moving body position data, the image data generation unit generates image data, which displays an existence of the moving body, of which an image is taken by said image taking device of one of the vehicles.

Thus in addition to an existence of a moving body, it is enabled to inform a driver of a position thereof.

In addition, a third aspect of the present invention is the communication system of the second aspect, and the image data generation unit compensates an image of the moving body so as to match a surrounding image combined, and based on the vehicle position data and the moving body position data, generates image data for displaying the compensated image of the moving body at a corresponding position and outputs it to the display unit of other vehicle.

Thus it is enabled to reduce a feeling of strangeness of a driver for a display of a moving body.

In addition, a fourth aspect of the present invention is the communication system of the second aspect, and the image data generation unit generates image data for displaying a compensated image of the moving body at a corresponding position in an image taken by the image taking device of other vehicle and outputs it to the display unit of other vehicle.

Thus it is enabled to markedly enhance a recognition of such a kind and position of a moving body by a driver.

In addition, a fifth aspect of the present invention is the communication system of any one of the second to fourth aspects, and the system further comprises an information sharing vehicle decision unit for deciding a combination of an information sharing vehicle.

Thus a communication opponent of each vehicle is preferably set.

In addition, a sixth aspect of the present invention is the communication system of the fifth aspect, and the information sharing vehicle decision unit combines each vehicle of which an image taken area is overlapped, based on the image taken area by the image taking device.

Thus it is enabled to reduce a communication with respect to a moving body that cannot be displayed.

In addition, a seventh aspect of the present invention is the communication system of either the fifth aspect or the sixth aspect that further comprises a search start determination unit for determining whether or not to start searching an information sharing vehicle, and in a case that the search start determination unit determines to start searching the information sharing vehicle, the information sharing vehicle decision unit determines a combination of the information sharing vehicle.

Thus because a combination of a vehicle is decided only when requested, it is enabled to reduce a processing amount of information.

In addition, an eighth aspect of the present invention is the communication system of the seventh aspect; and in a case that the moving body detection unit of the vehicle detects a moving body, the search start determination unit determines whether or not to start searching an information sharing vehicle with the vehicle, and in a case that the search start determination unit determines to start searching the information sharing vehicle with the vehicle, the information sharing vehicle decision unit determines the information sharing vehicle with the vehicle.

Thus it is enabled to do without a communication when a moving body is not detected.

In addition, a ninth aspect of the present invention is the communication system of the eighth aspect that further comprises a memory unit for memorizing map data; and the search start determination unit determines whether or not the vehicle is approaching a node in the map data, based on the vehicle position data and the map data, and in a case that the search start determination unit determines that the vehicle is approaching the node in the map data, the information sharing vehicle decision unit decides an information sharing vehicle with the vehicle.

Thus it is enabled to inform a driver of an existence of a moving body at an intersection (node) where there exist many dead angles and a high frequency of encounters with a moving-body.

In addition, it results in performing a communication only in a case that a vehicle is approaching a node (intersection and the like), and thus it is enabled to reduce a communication amount.

In addition, a tenth aspect of the present invention is the communication system of the ninth aspect that further comprises a vicinity vehicle extraction unit for extracting a vehicle positioned in the vicinity of the vehicle, and the information sharing vehicle decision unit decides an information sharing vehicle out of a vehicle extracted by the extraction unit.

Thus it is enabled to preferably narrow down a vehicle performing a communication.

An eleventh aspect of the present invention is the communication system of the first aspect that further comprises a sounding device for sounding a voice; and a voice data generation unit for generating voice data with respect to the voice made to be sounded by the sounding device of the vehicle, wherein the voice data generation unit generates voice data for informing an existence of a moving body from an image taken by the image taking device of one vehicle and outputs it to the sounding device of other vehicle.

Thus it is enabled to make a sounding device sound an existence of a moving body of which an image cannot be taken by an image taking device of a certain vehicle, and to inform a driver of the existence of such a moving body; and a communication opponent of each vehicle is preferably set.

In addition, a twelfth aspect of the present invention is the communication system of the eleventh aspect that further comprises an information sharing vehicle decision unit for deciding a combination of an information sharing vehicle, amd the information sharing vehicle decision unit combines each vehicle of which an image taken area is overlapped, based on the image taken area by the image taking device.

Thus a communication opponent of each vehicle is preferably set and it is enabled to reduce a communication with respect to a moving body that cannot be displayed.

In addition, a thirteenth aspect of the present invention is the communication system of the eleventh aspect that further comprises a search start determination unit for determining whether or not to start searching an information sharing vehicle; in a case that the search start determination unit determines to start searching the information sharing vehicle, the information sharing vehicle decision unit decides a combination of the information sharing vehicle, in a case that the moving body detection unit of the vehicle detects a moving body, the search start determination unit determines whether or not to start searching the information sharing vehicle with the vehicle, and in a case that the search start determination unit determines to start searching the information sharing vehicle with the vehicle, the information sharing vehicle decision unit decides the information sharing vehicle with the vehicle.

Thus because a combination of a vehicle is decided only when requested, it is enabled to reduce an information processing amount, and to do without a communication when a moving body is not detected.

In addition, a fourteenth aspect of the present invention is the communication system of the eleventh aspect that further comprises a memory unit for memorizing map data; and a vicinity vehicle extraction unit for extracting a vehicle positioned in the vicinity of the vehicle, and the search start determination unit determines whether or not the vehicle is approaching a node in the map data, based on the vehicle position data and the map data, and in a case that the search start determination unit determines that the vehicle is approaching the node, the information sharing vehicle decision unit determines an information sharing vehicle with the vehicle and decides the information sharing vehicle out of a vehicle extracted by the vicinity vehicle extraction unit.

Thus it is enabled to inform a driver of an intersection (node) where there exist many dead angles and a high frequency of encounters with a moving-body.

In addition, it results in performing a communication only when a vehicle is approaching a node (intersection and the like), and it is enabled to reduce a communication amount, and thus to preferably narrow down the vehicle for performing the communication.

A fifteenth aspect of the present invention is the communication system the first aspect that further comprises an image/character data generation unit for generating any of image and character data output to the display unit of the vehicle; an encounter determination unit for determining whether or not a moving body, which is detected by the moving body detection unit of one vehicle, and other vehicle encounter; a vehicle position data detection device for detecting vehicle position data with respect to a position of the vehicle; and a moving body position data generation unit for generating moving body position data with respect to a position of the moving body from an image taken by the image taking device, wherein the image/character data generation unit generates any of the image and character data for informing a determination result generated by the encounter determination unit and outputs it to the display unit of other vehicle, and wherein the encounter determination unit determines an encounter, based on the vehicle position data detected by the vehicle position data detection device and the moving body position data generated by the moving body position data generation unit.

Thus it is enabled to display a possibility in a display unit that a moving body, of which an image cannot be taken by an image taking device of a certain vehicle, and the vehicle encounter, to inform a driver of an existence of such a moving body, and to preferably determine the encounter between the vehicle and the moving body.

In addition, a sixteenth aspect of the present invention is the communication system of the fifteenth aspect that further comprises an information sharing vehicle decision unit for deciding a combination of an information sharing vehicle, and the information sharing vehicle decision unit combines each vehicle of which an image taken area is overlapped, based on the image taking area of the image taking device.

Thus a communication opponent of each vehicle is preferably set, and it is enabled to reduce a communication with respect to a moving body that cannot be displayed.

In addition, a seventeenth aspect of the present invention is the communication system of the fifteenth aspect that further comprises a search start determination unit for determining whether or not to start searching an information sharing vehicle; and in a case that the search start determination unit determines to start searching the information sharing vehicle, the information sharing vehicle decision unit decides a combination of the information sharing vehicle, in a case that the moving body detection unit of the vehicle detects a moving body, the search start determination unit determines whether or not to start searching the information sharing vehicle with the vehicle, and in a case that the search start determination unit determines to start searching the information sharing vehicle with the vehicle, the information sharing vehicle decision unit decides the information sharing vehicle with the vehicle.

Thus because a combination of a vehicle is decided only when requested, it is enabled to reduce an information amount, and to do without a communication when a moving body is not detected.

In addition, an eighteenth aspect of the present invention is the communication system of the fifteenth aspect that further comprises a memory unit for memorizing map data and a vicinity vehicle extraction unit for extracting a vehicle positioned in the vicinity of the vehicle; and the search start determination unit determines whether or not the vehicle is approaching a node in the map data, and in a case that the search start determination unit determines that the vehicle is approaching the node, the information sharing vehicle decision unit decides an information sharing vehicle with the vehicle out of a vehicle extracted by the vicinity vehicle extraction unit.

Thus it is enabled to inform a driver of an existence of a moving body at an intersection (node) where there exist many dead angles and a high frequency of encounters with a moving-body.

In addition, it results in performing a communication only when a vehicle is approaching a node (intersection and the like), and thus is enabled to reduce a communication amount and to preferably narrow down the vehicle where a communication is performed.

In addition, a nineteenth aspect of the present invention is the communication system of either the seventeenth or eighteenth aspect that further comprises a memory unit for memorizing a relationship between a vehicle speed and a stop distance, and the search start determination unit determines to start searching, based on the stop distance according to the vehicle speed.

Thus it is enabled to notify a driver of a determination result of an encounter at a distance where a vehicle can surely stop.

In addition, a twentieth aspect of the present invention is the communication system of the nineteenth aspect, and the stop distance is compensated, based on a driving environment.

A driving environment mentioned here is a weather condition (a dry road surface, a wet road surface), a presence or absence of an ABS (Antilock Brake System) mounting, a kind of tires (tires for summer, studless tires), and the like. Because a stop distance is compensated, based on these, a determination matching a more actual environment is enabled.

In addition, a twenty first aspect of the present invention is the communication system of the eleventh aspect that further comprises an encounter determination unit for determines whether or not a moving body detected by the moving body detection unit of one vehicle and other vehicle encounter, wherein the voice data generates voice data for informing a determination result generated by the encounter determination unit and outputs it to the sounding device of other vehicle, and the encounter determination unit determines an encounter, based on vehicle position data detected by the vehicle position data detection device and the moving body position data generated by the moving body position data generation unit.

Thus it is enabled to make a sounding device sound a possibility that a moving body, of which an image cannot be taken by an image taking device of a certain vehicle, and the vehicle encounter, to inform a driver of an existence of such a moving body, and to preferably determine an encounter between the vehicle and the moving body.

In addition, a twenty second aspect of the present invention is the communication system of the twenty first aspect that further comprises an information sharing vehicle decision unit for determining a combination of an information sharing vehicle, and the information sharing vehicle decision unit combines each vehicle of which an image taken area is overlapped, based on the image taken area by the image taking device.

Thus a communication opponent of each vehicle is preferably set, and it is enabled to reduce a communication with respect to a moving body that cannot be displayed.

In addition, a twenty third aspect of the present invention is the communication system of the twenty first aspect that further comprises a search start determination unit for determining whether or not to start searching an information sharing vehicle; and in a case that the search start determination unit determines to start searching the information sharing vehicle, the information sharing vehicle decision unit decides a combination of the information sharing vehicle, in a case that the moving body detection unit of the vehicles detects a moving body, the search start determination unit determines whether or not to start searching the information sharing vehicle with the vehicle, and in a case that the search start determination unit determines to start searching the information sharing vehicle with the vehicle, the information sharing vehicle decision unit decides the information sharing vehicle with the vehicle.

Thus because a combination of a vehicle is decided only when requested, it is enabled to reduce an information processing amount, and to do without a communication when a moving body is not detected.

In addition, a twenty fourth aspect of the present invention is the communication system of the twenty first aspect that further comprises a memory unit for memorizing map data and a vicinity vehicle extraction unit for extracting a vehicle positioned in the vicinity of the vehicle; the search start determination unit determines whether or not the vehicle is approaching a node in the map data, based on the vehicle position data and the map data, and in a case that the search start determination unit determines that the vehicle is approaching the node, the information sharing vehicle decision unit decides an information sharing vehicle out of a vehicle extracted by the vicinity vehicle extraction unit.

Thus it is enabled to inform a driver of an existence of a moving body at an intersection (node) where there exist many dead angles and a high frequency of encounters with a moving-body.

In addition, it results in performing a communication only when a vehicle is approaching a node (intersection and the like), and thus is enabled to reduce a communication amount and to preferably narrow down the vehicle where a communication is performed.

In addition, a twenty fifth aspect of the present invention is the communication system of either the twenty third or twenty fourth aspect that further comprises a memory unit for memorizing a relationship between a vehicle speed and a stop distance, and the search start determination unit determines to start searching, based on the stop distance according to the vehicle speed.

Thus it is enabled to notify a driver of a determination result of an encounter at a distance where a vehicle can surely stop.

In addition, a twenty sixth aspect of the present invention is the communication system of the twenty fifth aspect, and the stop distance is compensated, based on the driving environment.

BRIEF DESCRIPTION OF THE DRAWINGS

FIG. 13A is a drawing illustrating an image before the compensation; and FIG. 13B is a drawing illustrating an image after the compensation.

FIG. 14 is a drawing illustrating an image where an image of a moving body taken by the vehicle C1 is combined with that of the vehicle C2.

DESCRIPTION OF THE PREFERRED EMBODIMENTS

Here will be described an embodiment of the present invention in detail, referring to drawings as needed. A duplicate description will be omitted, appending a same symbol to a same portion. Meanwhile, "speed" described below is a scalar quantity. In addition, for convenience of a description, a moving body is distinguished in some case by describing one detected by own vehicle simply as "moving body" and one detected by other vehicle as "other moving body."

<Communication System between Vehicles>

Figure 1:
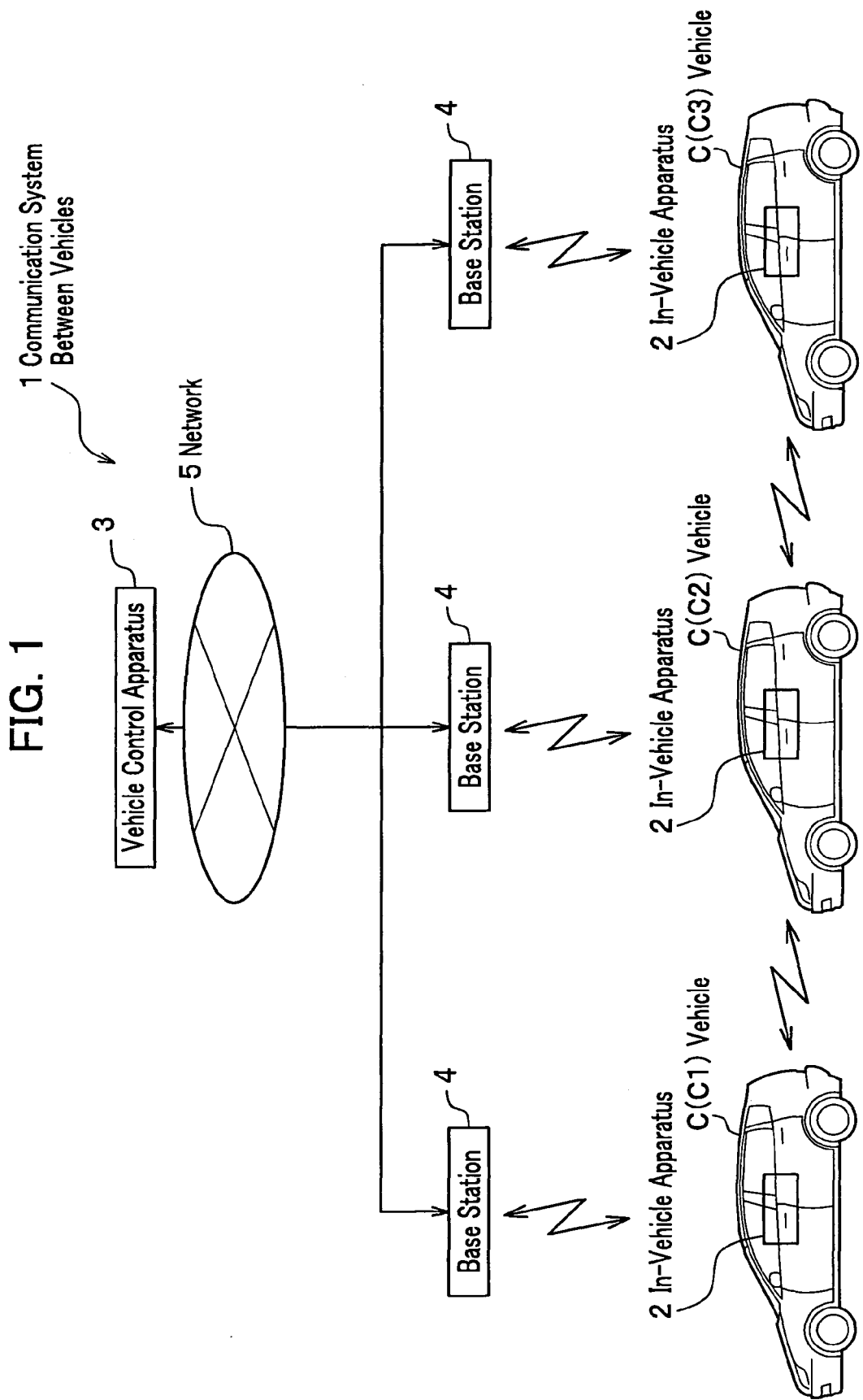
FIG. 1 is a system configuration drawing showing a communication system between vehicles related to an embodiment of the present invention.

Firstly, an outline of a communication system between vehicles related to an embodiment of the present invention will be described. FIG. 1 is a system configuration drawing showing a communication system 1 between vehicles related to an embodiment of the present invention.

As shown in FIG. 1, the communication system 1 between vehicles is a system usable in common with a car navigation system, and comprises in-vehicle apparatuses 2 individually provided at a plurality of vehicles C and a vehicle control apparatus 3. The vehicle apparatuses 2 can bi-directionally communicate with the vehicle control apparatus 3 via base stations 4 and a network 5, and also with the vehicle apparatuses 2 of other vehicles C via the vehicle control apparatus 3. In addition, the in-vehicle apparatuses 2 can directly communicate with those of other vehicles C not via the vehicle control apparatus 3. Hereafter, in a case that it is requested to distinguish a plurality of the vehicles C, it is described as "vehicle C1, vehicle C2, . . . "; in a case of no request of the above, it is described as "vehicles C."

<In-Vehicle Apparatus>

Figure 2:
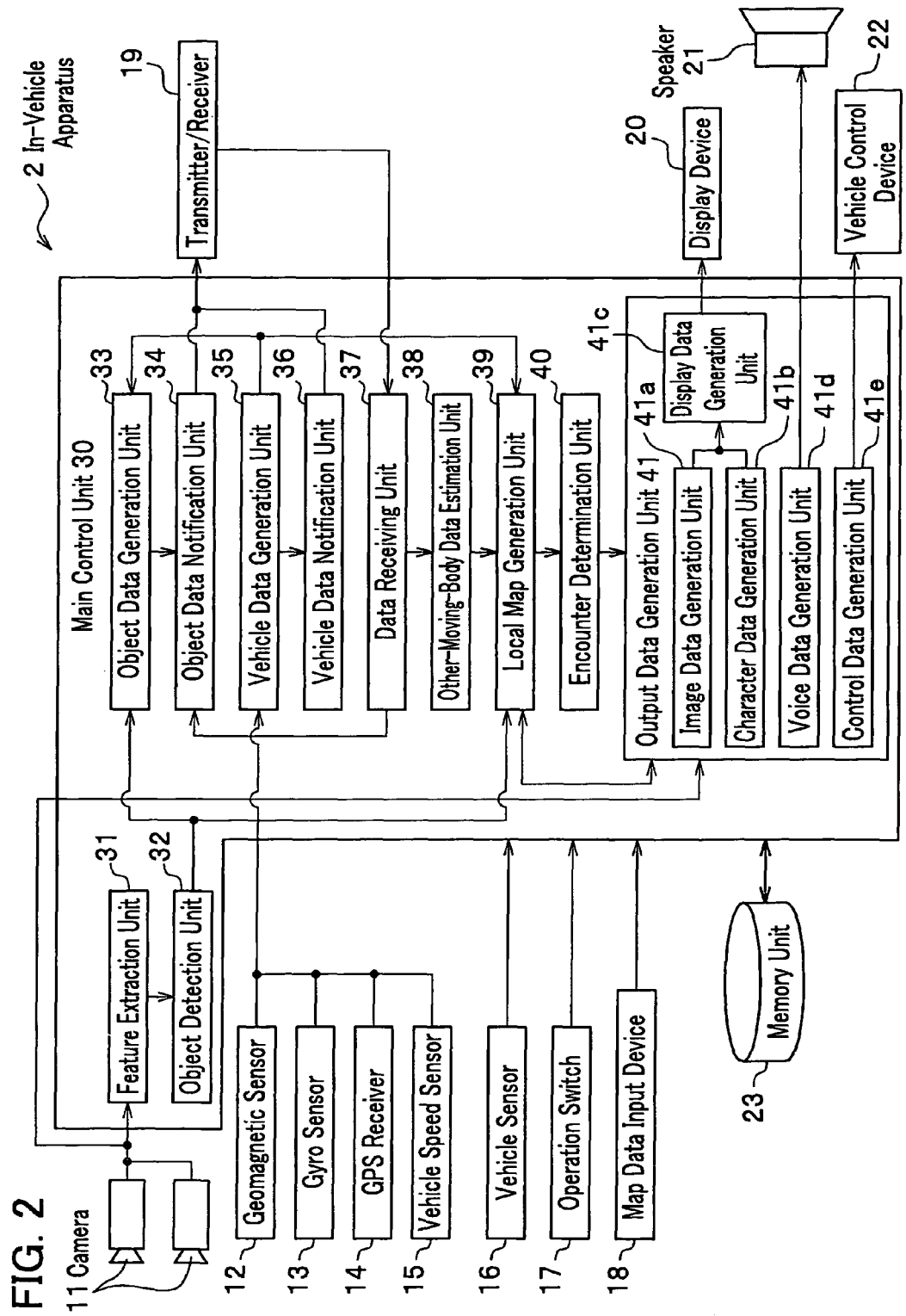
FIG. 2 is a block diagram showing an in-vehicle apparatus of FIG. 1.

Subsequently, the in-vehicle apparatuses 2 will be described. FIG. 2 is a block diagram showing the in-vehicle apparatuses 2 of FIG. 1.

As shown in FIG. 2, each of the in-vehicle apparatuses 2 related to the embodiment of the present invention comprises cameras 11, 11, a geomagnetic sensor 12, a gyro sensor 13, a GPS (Global Positioning System) receiver 14, a vehicle speed sensor 15, a vehicle sensor 16, an operation switch 17, a map data input device 18, a transmitter/receiver 19, a display device 20, a speaker 21, a vehicle control device 22, a memory unit 23, and a main control unit 30.

<Camera>

The cameras 11, 11 can bring in an image as digital data, and for example, a color CCD (Charge-Coupled Device) camera is used. The cameras 11, 11 are disposed side by side in parallel with right/left, and a taken image is output to a feature extraction unit 31 and an output data generation unit 41. The cameras 11, 11 are provided at each of the vehicles C so that an image before it can be taken.

The cameras 11, 11 are an example of "image taking device."

<Geomagnetic Sensor>

The geomagnetic sensor 12 detects data with respect to an orientation (hereinafter described as "orientation data") and outputs it to a vehicle data generation unit 35.

<Gyro Sensor>

The gyro sensor 13 detects data with respect to a direction (hereinafter described as "vehicle direction data") and outputs it to the vehicle data generation unit 35.

The gyro sensor 13 is an example of "vehicle direction data detection device."

<GPS Receiver>

The GPS receiver 14 detects data with respect to a position (hereinafter described as "vehicle position data") and outputs it to the vehicle data generation unit 35.

The GPS receiver 14 is an example of "vehicle position data detection device."

<Vehicle Speed Sensor>

The vehicle speed sensor 15 detects a speed of the vehicle C (hereinafter described as "vehicle speed data") and outputs it to the vehicle data generation unit 35.

<Vehicle Sensor>

The vehicle sensor 16 detects various states of the vehicle C and is a sensor group including sensors for detecting such an operation amount of a brake pedal, an operation amount of a gas pedal, a rotation number of an engine, and an operation amount of a wheel.

<Operation Switch>

The operation switch 17 is a switch group for operating a driving state of the in-vehicle apparatus 2, and for example, comprises such switches for switching ON/OFF of the display device 20 and adjusting an output volume of the speaker 21.

<Map Data Input Device>

The map data input device 18 inputs map data and memorize it in the memory unit 23.

<Transmitter/Receiver>

The transmitter/receiver 19 is a radio communication device that transmits various pieces of data output from the main control unit 30 to the base station 4; receives various pieces of data output from a control unit 50 (see FIG. 3) of the vehicle control apparatus 3 and transmitted from the base station 4, and receives various pieces of data output from the main control unit 30 of other vehicle C and transmitted from its transmitter/receiver 19.

The transmitter/receiver 19 is an example of "transmitting/receiving device."

<Display Device>

The display device 20 is a device for outputting an image around the vehicle C taken by the cameras 11, 11 and another image based on map data memorized in the memory unit 23 described later.

In addition, the display device 20 displays an image, based on image data generated by an image data generation unit 41a described later, and a character, based on character data generated by a character data generation unit 41b described later.

The display device 20 is provided at a position recognizable through view by a driver inside a vehicle room of the vehicle C.

The display device 20 is an example of "display unit."

<Speaker>

The speaker 21 outputs a voice, based on voice data generated by a voice data generation unit 41d described later.

The speaker 21 is provided inside the vehicle room of the vehicle C and is designed to be able to transfer an output voice to a driver.

The speaker 21 is an example of "sounding device."

<Vehicle Control Device>

The vehicle control device (ECU: Electrical Control Unit) 22 controls a movement of the vehicle C. The vehicle control device 22 controls a brake liquid pressure and makes a klaxon generate an alarm sound, based on a detection result of the vehicle sensor 16 and an output of the output data generation unit 41.

<Memory Unit>

The memory unit 23 memorizes a vehicle ID with respect to the vehicle C where the in-vehicle apparatus 2 is mounted, map data, and the like.

<Main Control Unit>

The main control unit 30 comprises a feature extraction unit 31, an object detection unit 32, an object data generation unit 33, an object data notification unit 34, the vehicle data generation unit 35, a vehicle data notification unit 36, a data receiving unit 37, an other-moving-body data estimation unit 38, a local map generation unit 39, an encounter determination unit 40, and the output data generation unit 41.

<Feature Extraction Unit>

The feature extraction unit 31 extracts an edge component of an image and obtains a distance image.

<Object Detection Unit>

The object detection unit 32 derives a group cluster of a distance image using a snake method and the like, based on an extraction result of the feature extraction unit 31, determines an identity with a last cluster, and detects an object; the unit 32 is an example of "moving body detection unit." As an object detection method by these feature extraction unit 31 and object detection unit 32 can be used a method described, for example, in Japanese Patent Laid-Open Publication Nos. 2004-46426 and 2004-103018 applied by the same applicants of the present invention.

As an object can be cited a moving body including such a human being, a bicycle, and a vehicle (a car, a bus, a truck, and the like), and an intersection.

In addition, the object detection unit 32 generates data (hereinafter described as "object relative data" with respect to the object, and outputs it to the object data generation unit 33 and the local map generation unit 39 described later.

The object relative data includes an object ID, object image data, object relative position data, object relative speed data, object relative direction data, and kind data.

The object ID is given to every moving body detected by the object detection unit 32.

The object image data is image data for displaying an object.

The object relative position data is data with respect to a gravity center position of a detected object, and indicates a relative position of the object to the vehicle C.

The object relative speed data is data with respect to a speed of a detected object, and indicates a relative speed of the object to the vehicle C. The object detection unit 32 calculates the object relative speed data by comparing a new frame (image) with a past frame.

The object relative direction data is data with respect to a direction (moving direction) of a detected object and indicates a relative moving direction of the object to the vehicle C. The object detection unit 32 calculates the object relative direction data by comparing a new frame (image) with a past frame.

The kind data is data with respect to a kind of a detected object. The object detection unit 32 refers to related data where a kind and form of an object are memorized in advance, thereby specifies what the detected object is, and generates the kind data.

Meanwhile, the object detection unit 32 can also refer to vehicle data generated by the vehicle data generation unit 35 in calculating and generating various pieces of data. This is because the object detection unit 32 calculates and generates the various pieces of the data of an object, considering a moving direction and speed of the vehicle C.

<Object Data Generation Unit>

The object data generation unit 33 generates object data, based on a detection result (object relative data) detected by the object detection unit 32 and vehicle data (described later) generated by the vehicle data generation unit 35. In other words, the object data generation unit 33 generates data (object data) of an object with respect to a road, based on a relative relationship (object relative data) between the object and the vehicle C, and data (vehicle data) of the vehicle C with respect to the road.

The object data is data including an object ID, object image data, object position data, object speed data, object direction data, and kind data.

In other words, the object data generation unit 33 is an object position data generation unit (moving body data generation unit), an object speed data generation unit (moving body speed generation unit), and an object direction data generation unit (moving body data generation unit). Meanwhile, the object position data, the object speed data, and the object direction data may be data representing physical quantities equivalent to these; for example, as the object position data can also be used position data of the vehicle C that has detected the object, and relative position data of the object to the vehicle C. In such a case the combination of the GPS receiver 14 and the object detection unit 32 corresponds to the object position data generation unit. This is same in other data.

<Object Data Notification Unit>

The object data notification unit 34 gives a vehicle ID of the vehicle C to object data generated by the object data generation unit 33, and outputs it. The output object data is notified to the vehicle control apparatus 3 and the in-vehicle apparatuses 2 of other vehicles C via the transmitter/receiver 19.

In addition, the object data notification unit 34 outputs a signal for any one of connecting and disconnecting a communication state with the vehicle control apparatus 3 and the in-vehicle apparatuses 2 of other vehicles C.

<Vehicle Data Generation Unit>

The vehicle data generation unit 35 generates vehicle data, based on detection results of the geomagnetic sensor 12, the gyro sensor 13, the GPS receiver 14, and the vehicle speed sensor 15. The vehicle data is data including own vehicle ID, vehicle direction data, vehicle position data, and vehicle speed data. The generated vehicle data is output to the vehicle data notification unit 36 and the local map generation unit 39.

In addition, the vehicle data generation unit 35 estimates the vehicle direction data, the vehicle position data, and the vehicle speed data at a current time by Kalman filter, and adopts these pieces of the estimated data as the vehicle data.

<Vehicle Data Notification Unit>

The vehicle data notification unit 36 outputs the vehicle data generated by the vehicle data generation unit 35. The output vehicle data is notified to the vehicle control apparatus 3 via the transmitter/receiver 19.

<Data Receiving Unit>

The data receiving unit 37 receives data transmitted from the vehicle control apparatus 3 and the in-vehicle apparatuses 2 of other vehicles C. Other-moving-body data of a kind of the received data is output to the object data notification unit 34 and the other-moving-body data estimation unit 38.

<Other-Moving-Body Data Estimation Unit>

The other-moving-body data estimation unit 38 estimates other-moving-body data (hereinafter described as "other-moving-body estimation data) at a current time. Such a estimation is performed by Kalman filter. In addition, the other-moving-body data estimation unit 38 generates data (hereinafter described as "other-moving-body relative position data") with respect to a relative position of other moving-body to own vehicle C.

<Local Map Generation Unit>

The local map generation unit 39 generates a local map with respect to a state around the vehicle C, based on the vehicle data generated by the vehicle data generation unit 35, the moving body data generated by the object data generation unit 33, and the other-moving-body estimation data estimated by the other-moving-body data estimation unit 38. The local map controls such a position and speed of a moving body around the vehicle C according to time, and estimates those of a current moving body from these past histories. The encounter determination unit 40 determines whether or not own vehicle C and the moving body encounter, based on the estimated data.

Here, the local map generation unit 39 determines an identity between the vehicle data generated by the vehicle data generation unit 35 and the object data generated by the object data generation unit 33, and the other-moving-body estimation data estimated by the other-moving-body data estimation unit 38. Then, only in a case that the identity is denied, the other-moving-body estimation data is integrated into the local map.

This is to prevent data from overlapping by integrating into the local map other moving body same as own vehicle C and other moving body same as a moving body of which data is acquired by the own vehicle C.

<Encounter Determination Unit>

The encounter determination unit 40 determines whether or not own vehicle C and a moving body (other moving body) detected by other vehicle C encounter. A determination result is output to the output data generation unit 41. A detail of the determination method by the encounter determination unit 40 will be described later.

<Output Data Generation Unit>

The output data generation unit 41 generates output data for transferring an existence of other moving body and a determination result of an encounter of own vehicle C with the other moving body to a driver, and comprises the image data generation unit 41a, the character data generation unit 41b, the display data generation unit 41c, the voice data generation unit 41d, and a control data generation unit 41e.

<Image Data Generation Unit>

The image data generation unit 41*a* generates image data for displaying an existence of other moving body and displays it in the display device 20 via the display data generation unit 41*c*.

<Character Data Generation Unit>

The character data generation unit 41*b* generates character data for representing an existence of other moving body and a determination result of an encounter of own vehicle C with the other moving body, and displays the character data in the display device 20 via the display data generation unit 41*c*.

The image data generation unit 41*a* and the character data generation unit 41*b* are an example of "image/character data generation unit."

<Display Data Generation Unit>

The display data generation unit 41*c* generates display data and displays it in the display device 20, based on the image data generated by the image data generation unit 41*a* and the character data generated by the character data generation unit 41*b*.

<Voice Data Generation Unit>

The voice data generation unit 41*d* generates voice data for informing an existence of other moving body and a determination result of an encounter of own vehicle C with the other moving body, and makes the speaker 21 speak.

In order to generate the voice data, a corresponding relationship between character information and the voice data memorized in advance is used.

<Control Data Generation Unit>

The control data generation unit 41*e* generates control data for controlling a movement of own vehicle C, based on a determination result of an encounter of the own vehicle C with the other moving-body, and makes the vehicle control device 22 control the own vehicle C.

<Vehicle Control Apparatus>

Figure 3:
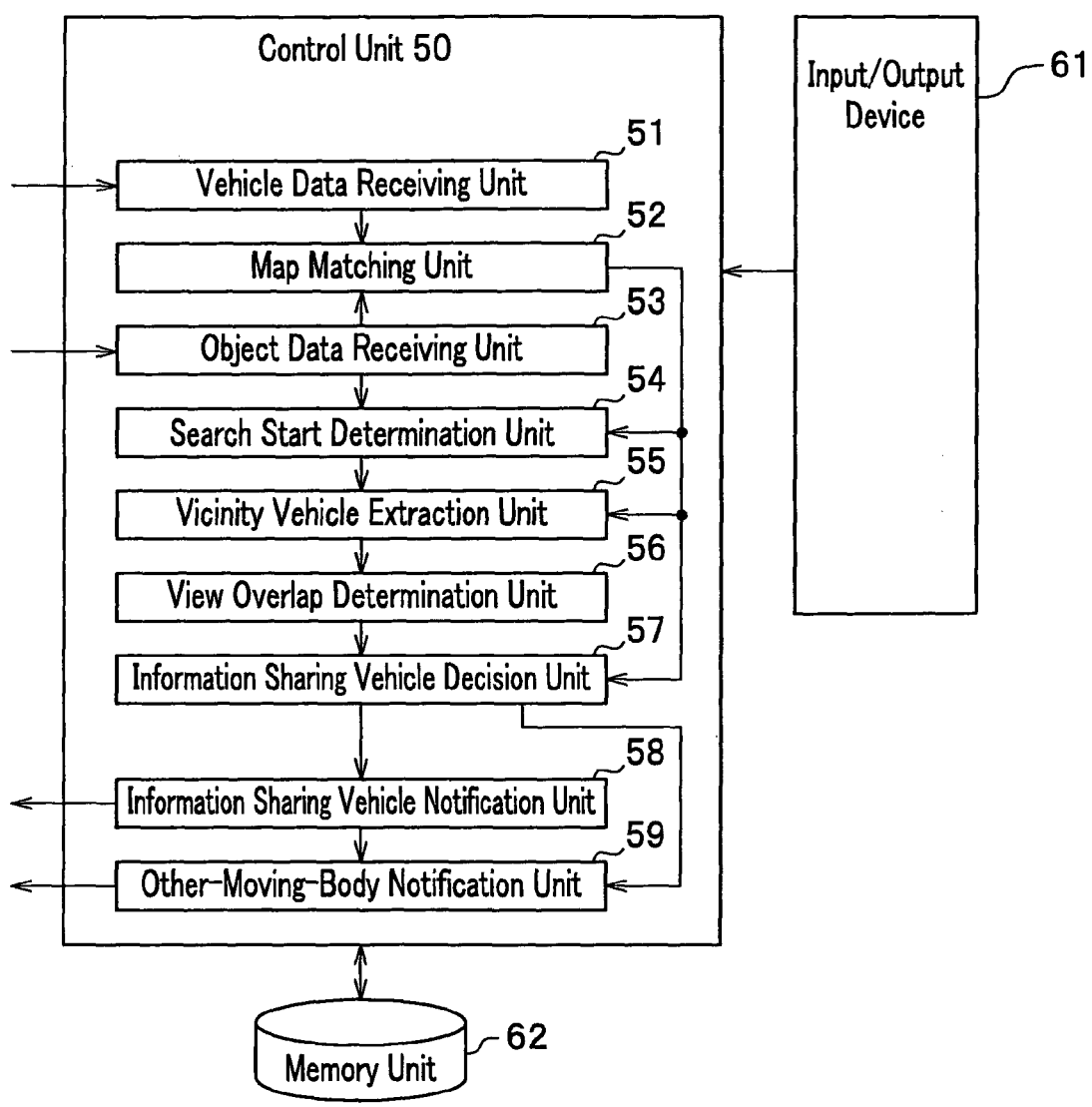
FIG. 3 is a block diagram showing a vehicle control apparatus of FIG. 1.

Subsequently, the vehicle control apparatus 3 will be described. FIG. 3 is a block diagram showing the vehicle control apparatus 3 of FIG. 1.

As shown in FIG. 3, the vehicle control apparatus 3 comprises the control unit 50, an input device 61, and a memory unit 62.

The control unit 50 comprises a vehicle data receiving unit 51, a map matching unit 52, an object data receiving unit 53, a search start determination unit 54, a vicinity vehicle extraction unit 55, a view overlap determination unit 56, an information sharing vehicle decision unit 57, an information sharing vehicle notification unit 58, and an other-moving-body <Vehicle Data Receiving Unit>

The vehicle data receiving unit 51 receive vehicle data transmitted from the in-vehicle apparatus 2 of each vehicle C. The received vehicle data is output to the map matching unit 52.

<Map Matching Unit>

The map matching unit 52 matches the vehicle data with map data memorized in the memory unit 62. By such a matching are set a road (arc) where the vehicle C is driving and an intersection (node) where the vehicle C is heading.

<Object Data Receiving Unit>

The object data receiving unit 53 receives object data, where a vehicle ID is given, from the vehicle C that has detected a moving body. The received vehicle ID and object data are matched by the map matching unit 52, and then are output to the search start determination unit 54.

<Search Start Determination Unit>

The search start determination unit 54 determines whether or not to search a vehicle (information sharing vehicle) sharing information with the vehicle C with respect to the vehicle C that has transmitted object data. A detail of such a search method will be described later.

<Vicinity Vehicle Extraction Unit>

The vicinity vehicle extraction unit 55 extracts the vehicle C positioned in the vicinity of a vehicle with respect to the vehicle ID given to the object data received by the object data receiving unit 53, based on the object data matched by the map matching unit 52. A detail of such an extraction method will be described later.

<View Overlap Determination Unit>

The view overlap determination unit (image taken area overlap determination unit) 56 determines a vehicle C, which has transmitted object data, out of vehicles C extracted by the vicinity vehicle extraction unit 55; each view, that is, whether or not each image taken area by cameras 11, 11, overlaps; and how much the each view overlaps. Meanwhile, a detail of a view overlap determination method will be described later.

<Information Sharing Vehicle Decision Unit>

The information sharing vehicle decision unit 57 selects an information sharing vehicle with a vehicle C, which has transmitted object data, out of the vehicles C extracted by the vicinity vehicle extraction unit 55, and decides a combination of these information sharing vehicles. In such a decision the information sharing vehicle determination unit 57 can use a determination result by the view overlap determination unit 56.

<Information Sharing Vehicle Notification Unit>

The information sharing vehicle notification unit 58 notifies the decided vehicles of the decision by the information sharing vehicle determination unit 57. In an example of FIG. 6 the information sharing vehicle notification unit 58 notifies a vehicle C1 of a vehicle C2 being an information sharing vehicle, and the vehicle C2 of the vehicle C1 being the information sharing vehicle. In addition, the information sharing vehicle notification unit 58 notifies the in-vehicle apparatus 2 of the vehicle C2, of vehicle data of the vehicle C1 that has detected a moving body.

<Other-Moving-Body Data Notification Unit>

The other-moving-body data notification unit 59 notifies other vehicle C, which has not detected the object, of the object data (other-moving-body data) out of an information sharing vehicle decided by the information sharing vehicle determination unit 57.

<Input Device>

The input device 61 is a device for inputting various pieces of data (map data and the like) memorized in the memory unit 62.

<Memory Unit>

The memory unit 62 memorizes such map data, vehicle data transmitted from each vehicle C, and camera information of the each vehicle C (attachment directions of the cameras 11, 11 for a vehicle body, an image taken area, and the like). Out of these, the map data is data where an intersection is set as a node and a road connecting each intersection as an arc.

<First Operation Example of Communication System between Vehicles>

Subsequently, in a first operation example of the communication system 1 between vehicles will be described the in-vehicle apparatus 2 and the vehicle control apparatus 3 in this order.

<First Operation Example of In-Vehicle Apparatus>

Figure 4:
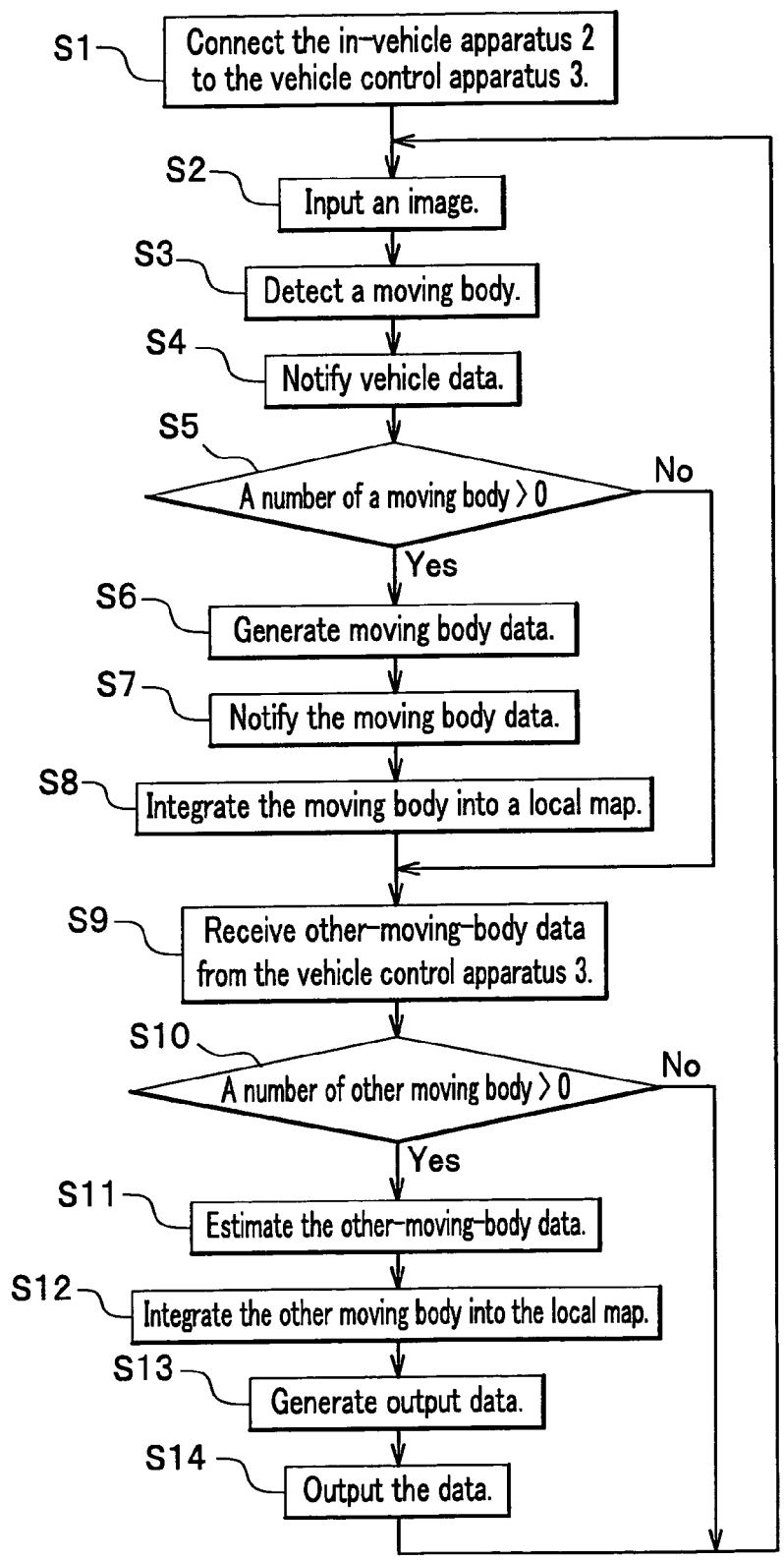
FIG. 4 is a flowchart describing a first operation example of an in-vehicle apparatus.

Firstly, a first operation example of the in-vehicle apparatus 2 will be described. FIG. 4 is a flowchart describing the first operation example of the in-vehicle apparatus 2.

Firstly, the in-vehicle apparatus 2 and the vehicle control apparatus 3 are connected so as to be communicable with each other (step S1). Subsequently, the cameras 11, 11 acquire an image (step S2). Then the feature extraction unit 31 extracts a feature of the image, and the object detection unit 32 detects a moving body of a kind of an object (step S3). Then the vehicle data notification unit 36 notifies the vehicle control apparatus 3 of vehicle data (step S4). In a case that there exists the moving body detected by the object detection unit 32 (Yes in a step 5), the object data generation unit 33 generates moving body data of a kind of object data (step S6), and the object data notification unit 34 notifies the vehicle control apparatus 3 of the moving body data (step S7). Subsequently, the local map generation unit 39 integrates the moving body data into a local map (step S8).

Meanwhile, in the step S5, in a case that no moving body is detected, the processing moves to a step S9.

Subsequently, the data receiving unit 37 receives other-moving-body data from the vehicle control apparatus 3 (step S9). In a case that there exists the other-moving-body data (Yes in a step 10), the other-moving-body data estimation unit 38 estimates the other-moving-body data (generates other-moving-body estimation data) (step S11), and the local map generation unit 39 integrates the other-moving-body estimation data into the local map (step S12). Then the output data generation unit 41 generates output data (step S13), outputs the generated output data, and notifies a driver of an existence of the other-moving-body (step S14). After then, the processing moves to the step S2, and a series of the processing is repeated.

Meanwhile, in a case of No in the step S10, the processing moves to the step S2, and a series of the processing is repeated.

Meanwhile, in a case that the other moving body integrated into the local map in the step S12 is same as own vehicle C and a moving body detected by the own vehicle C, the processing of the steps S12 and S14 is omitted.

<First Operation Example of Vehicle Control Apparatus>

Figure 5:
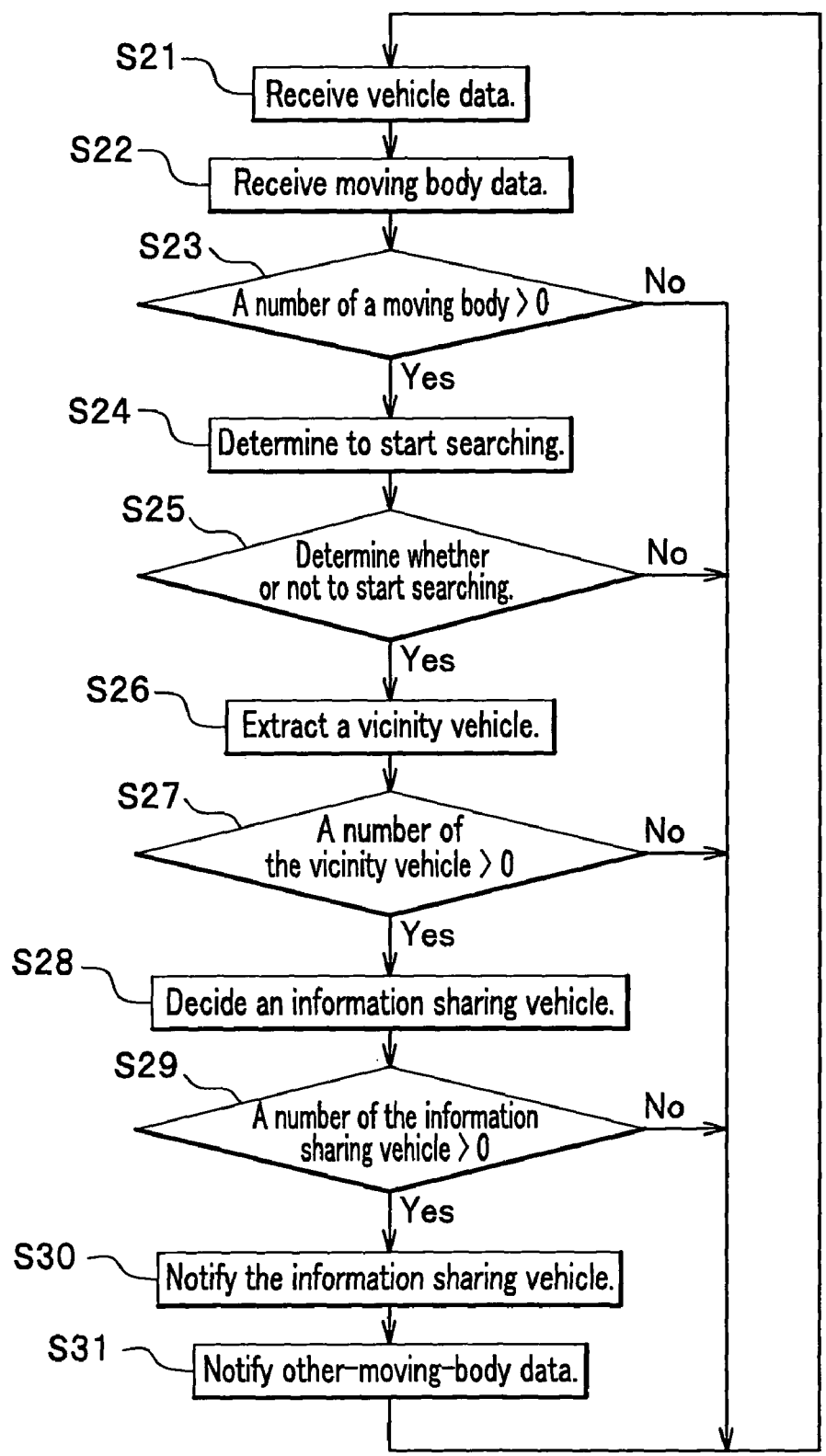
FIG. 5 is a flowchart describing a first operation example of a vehicle control apparatus.

Subsequently, a first operation example of the vehicle control apparatus 3 will be described. FIG. 5 is a flowchart describing the first operation example of the vehicle control apparatus 3.

Firstly, the vehicle data receiving unit 51 receives the vehicle data notified by the vehicle data notification unit 36 of each vehicle C in the step S4 (step S21). Then the object data receiving unit 52 receives the moving body data notified by the object data notification unit 34 of the vehicle C in the step S7 (step S22). In a case that there exists the received moving body data (Yes in a step 23), the search start determination unit 54 is activated and determines whether or not to start searching (step S24). In a case of starting searching (Yes in a step S25), the vicinity vehicle extraction unit 55 extracts a vehicle positioned in the vicinity of the vehicle C that has notified the object data (step S26). In a case that there exists the vehicle in the vicinity (Yes in a step 27), the view overlap determination unit 56 determines a degree of a view overlap between the vehicle C and the vicinity vehicle, and based on a determination result thereof, the information sharing vehicle decision unit 57 decides an information sharing vehicle with the vehicle C, which has notified the moving body data, out of the vicinity vehicle (step S28).

In a case that there exists the information sharing vehicle with the vehicle C (Yes in a step S29), the information sharing vehicle notification unit 58 notifies each vehicle, which is decided to be the information sharing vehicle C, of the decision (step S30), the other-moving-body data notification unit 59 notifies the information sharing vehicle of the object data as other-moving-body data (Step S31). After then, the processing moves to the step S21, and a series of the processing is repeated.

Meanwhile, in cases of No in the steps S23, S25, S27, and S29, the processing moves to the step S21, and a series of the processing is repeated.

<Detailed Description of Each Method>

Figure 6:
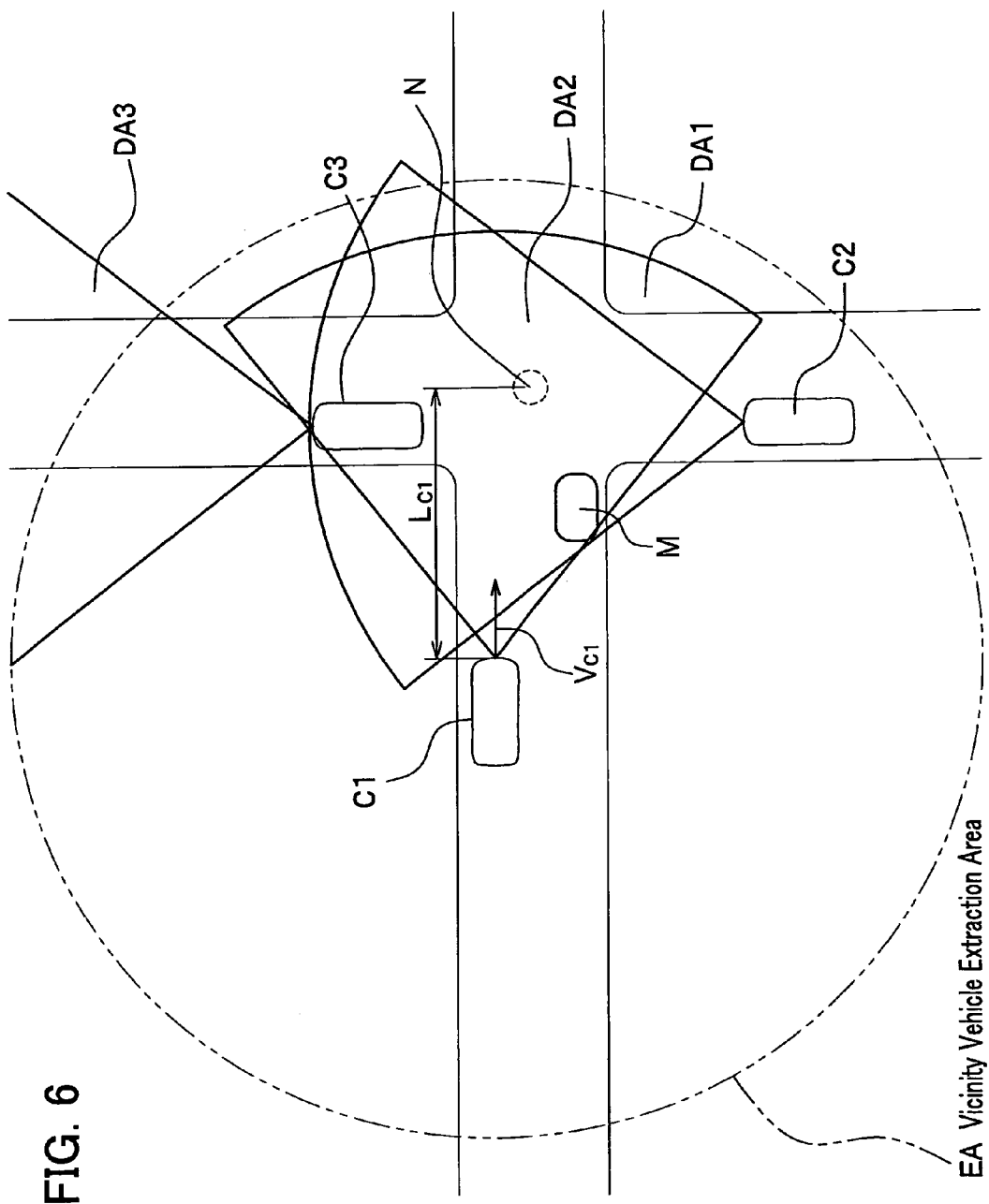
FIG. 6 is a drawing illustrating an example of methods of: determining to start a search of an information sharing vehicle, extracting a vicinity vehicle, and determining a view overlap.

Subsequently, taking a state as an example where the vehicles C1, C2, and C3 and the moving body M are disposed as shown in FIG. 6, the methods of: determining to start a search of an information sharing vehicle by the search start determination unit 54; extracting a vicinity vehicle by the vicinity vehicle extraction unit 55; and determining a view overlap by the view overlap determination unit 56 will be described more in detail. FIG. 6 is a drawing illustrating an example of methods of: determining to start a search of an information sharing vehicle, extracting a vicinity vehicle, and determining a view overlap.

<Search Start Determination>

Firstly will be described an example of a method of determining to start a search of an information sharing vehicle by the search start determination unit 54 of the vehicle control apparatus 3.

As shown in FIG. 6, in map data memorized in the memory unit 62 of the vehicle control apparatus 3 is set an intersection (signal) of roads as a node N.

With respect to the vehicle C1 that has detected the moving body M, the search start determination unit 54 calculates a margin stop distance L of the vehicle C1, based on position data and vehicle speed data included in vehicle data transmitted from the vehicle C1 and position data of the node N in the map data:

$$L = (Tc + Ti) \times V_{C1} + Ls, \quad (1)$$

where Tc, time requested for establishing a communication and acquiring other vehicle information; Ti, image processing time; $V_{C1}$, current vehicle speed of the vehicle C1 (it is assumed that a direction of approaching the node N is "positive," and that of leaving from the node N is "negative"); and Ls, stop distance based on the current vehicle speed of the vehicle C1.

The margin stop distance L is a distance where the vehicle C1 can stop before the node N, considering a time requested for such a communication of the communication system 1 between vehicles.

In a case that a distance $L_{C1}$ between the vehicle C1 and the node N becomes not more than the margin stop distance L, the search start determination unit 54 determines so as to search an information sharing vehicle with the vehicle C1. In other words, in a case that the vehicle C1 which has detected the moving body M is approaching the node N (intersection) under a predetermined condition, the search start determination unit 54 determines that it is requested to start searching the information sharing vehicle.

Meanwhile, the stop distance Ls changes according to a driving environment such as a weather condition (dry road surface, wet road surface) a vehicle condition (with or without an ABS (Antilock Brake System), and a tire condition (tires for summer, studless tires), and a relationship between these driving environment and stop distance Ls is memorized in advance in the memory unit 23. Then the driving environment is input in the main control unit 30 of each vehicle C from any one of the vehicle sensor 16 and an input device not shown, and is transmitted to the vehicle control apparatus 3 as part of vehicle data.

In addition, the search start determination unit 54 may also comprise inside the main control unit 30 a driving environment data acquirement unit for acquiring data (driving environment data) with respect to the driving environment, and a driving environment data notification unit for notifying the vehicle control apparatus 3 of the driving environment data; and be a configuration of separately processing the driving environment data and the vehicle data.

Figure 7A:
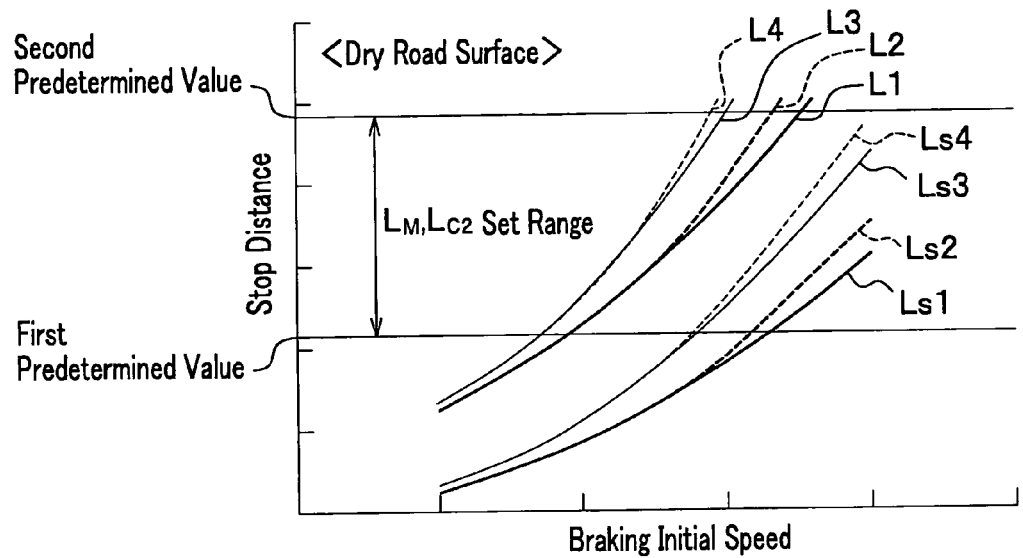
FIGS. 7A and 7B are graphs illustrating margin stop distances, respectively.
Figure 7B:
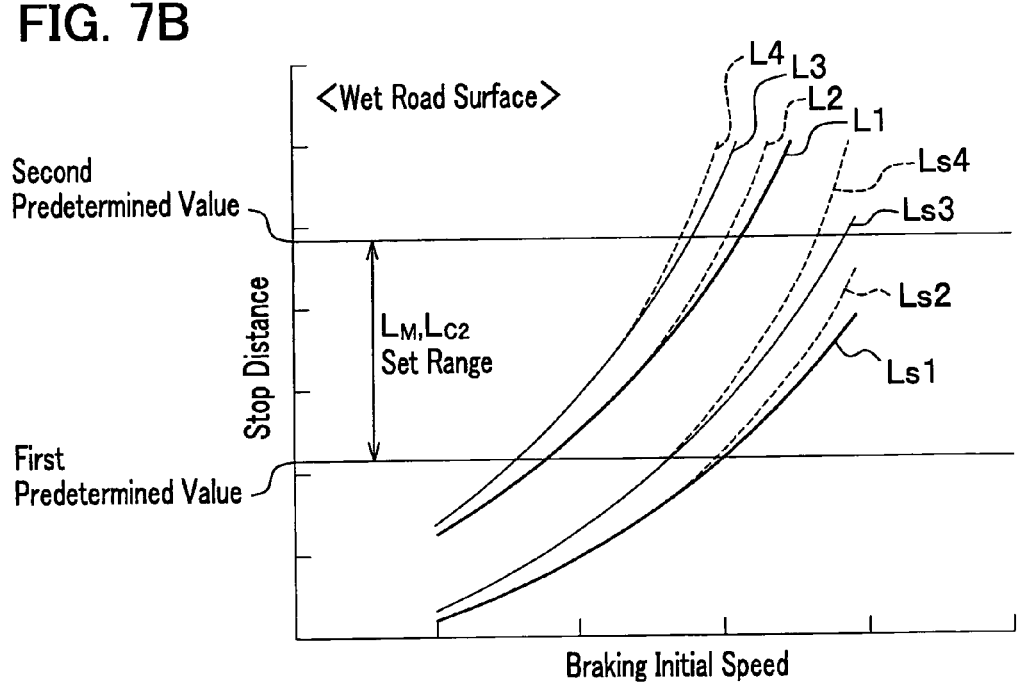

FIGS. 7A and 7B are graphs illustrating margin stop distances, respectively.

FIG. 7A is a graph representing the stop distance Ls and the margin stop distance L under every vehicle condition and tire condition in a case that a weather condition is a "dry road surface;" FIG. 7B is a graph representing the stop distance Ls and the margin stop distance L under every vehicle condition and tire condition in a case that the weather condition is a "wet road surface."

Here, condition settings of stop distances Ls1 to Ls4 and margin stop distances L1 to L4 are as follows:

Ls1, L1: a tire condition, "tires for summer attached;" a vehicle condition, "with an ABS;"

Ls2, L2: a tire condition, "tires for summer attached;" a vehicle condition, "without an ABS;"

Ls3, L3: a tire condition, "studless tires attached;" a vehicle condition, "with an ABS;" and Ls4, L4: a tire condition, "studless tires attached;" a vehicle condition, "without an ABS."

As shown in FIGS. 7A and 7B, the stop distance Ls has a different value according to a weather condition (road surface condition). In addition, thus the margin stop distance L also differs according to the weather condition. In addition, the stop distance Ls changes according to not only the weather condition but also the vehicle condition (with or without an ABS), the tire condition (tires for summer, studless tires), and the like; and the memory unit 23 memorizes these corresponding relationships.

In addition, the memory unit 23 memorizes the stop distance Ls based on the weather condition, the vehicle condition, the tire condition, and the like, and therein the time Tc and the time Ti are set; therefore, based on these and the vehicle speed $V_{C1}$, the search start determination unit 54 can calculate the margin stop distance L where the vehicle speed $V_{C1}$ is made a braking initial speed.

Meanwhile, the in-vehicle apparatus 2 can acquire the weather condition from a navigation system connected to the communication system 1 and a detection result of a rain drop sensor mounted on the vehicle C.

In addition, in a case that the vehicle C mounts an ABS, the in-vehicle apparatus 2 can also determine the weather condition, based on a slip detection thereof.

In addition, the in-vehicle apparatus 2 can also determine the weather condition, based on an operation state of a wiper of the vehicle C.

In addition, in the in-vehicle apparatus 2 can be input the vehicle condition and the tire condition from an input device not shown.

<Vicinity Vehicle Extraction>

Subsequently will be described an example of a method of extracting a vicinity vehicle by the vicinity vehicle extraction unit 55 of the vehicle control apparatus 3.

In a case that the search start determination unit 54 determines that it is requested to start searching an information sharing vehicle, the vicinity vehicle extraction unit 55 extracts a vehicle in the vicinity of the vehicle C1.

The vicinity vehicle extraction unit 55 extracts other vehicles C positioned within a predetermined distance from the vehicle C1, that is, a vicinity vehicle extraction area EA shown in FIG. 6, based on vehicle position data of each vehicle C received by the vehicle data receiving unit 51 and memorized in the memory unit 62. Here, the vehicles C2 and C3 are extracted.

Thus, because the vicinity vehicle extraction unit 55 extracts the vehicles C2 and C3 positioned in the vicinity of the vehicle C1 as decision pre-processing of the information sharing vehicle, it is enabled to ignore a remote vehicle C and thus to simplify processing in deciding the information sharing vehicle.

<View Overlap Determination>

Subsequently will be described an example of a method of determining a view overlap by the view overlap determination unit 56 of the vehicle control apparatus 3.

In a case that the vicinity vehicle extraction unit 55 extracts vicinity vehicles C (C2, C3) of the vehicle C1, the view overlap determination unit 56 calculates an overlap ratio of a view DA1 of the vehicle C1 to the views DA2, DA3 of the vicinity vehicles C (C2, C3).

Then, based on data (any one of an image taken area by camera and a moving body detection area) of each vehicle C memorized in the memory unit 62, the information sharing vehicle decision unit 57 decides the vehicle C, which overlaps own image taken area with not less than 50% of the image taken area DA1 of the vehicle C1 (here, the image taken area DA2 of the vehicle C2 is relevant; the image taken area DA3 of the vehicle C3 is not relevant), as the information sharing vehicle with the vehicle C1. Here, the vehicle C2 is the information sharing vehicle with the vehicle C1 and the vehicle C3 is not relevant to the information sharing vehicle.

Such an overlap ratio of an image taken area is appropriately changeable in setting.

In addition, a top portion of the image taken area is appropriately changeable in setting. According to the setting of the top portion of the image taken area, a selection result of the information sharing vehicle is adjustable. Meanwhile, a relationship between a size of an image taken area and a vehicle shown after FIG. 6 is deformed for a description of the present invention and does not accurately represent an actual relationship.

<Encounter Determination>

Figure 8:
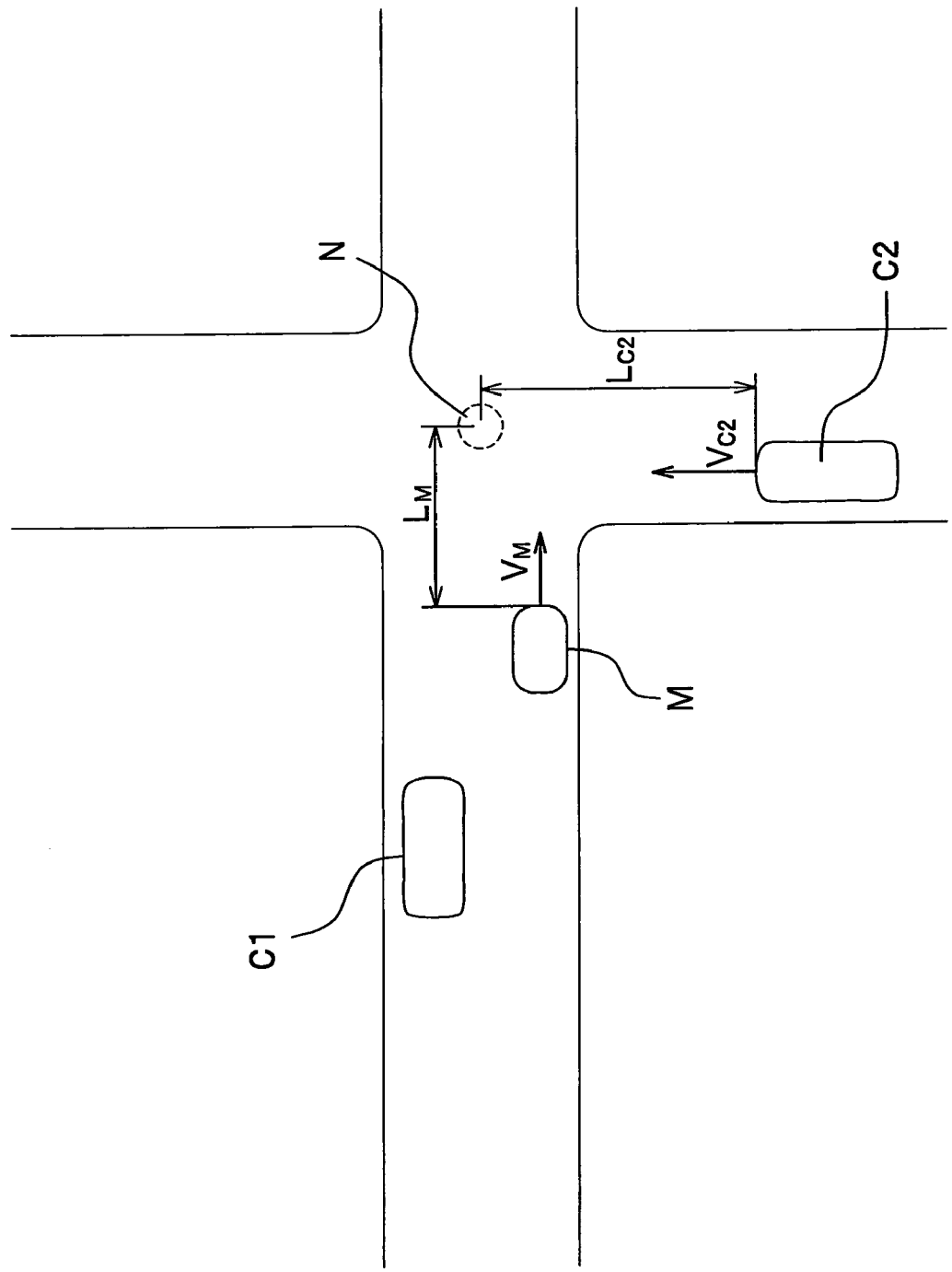
FIG. 8 is a drawing illustrating an encounter determination.

Subsequently will be described a determination of an encounter between the vehicle C and other moving body (moving body) by the encounter determination unit 40. FIG. 8 is a drawing illustrating a determination of an encounter between the vehicles C1, C2 and the moving body M.

As shown in FIG. 8, the vehicles C1 and C2 are driving toward the common node (intersection) N. In addition, the vehicle C1 is taking an image of the moving body M.

The encounter determination unit 40 of the vehicle C2 calculates a time difference Ts (hereinafter described as "margin time Ts") between each time when own vehicle C2 or the other moving body M passes through the node N.

The margin time Ts is calculated according to an equation (2) below:

$$Ts = |L_M/V_M - L_{C2}/V_{C2}|, \quad (2)$$

where $L_M$, distance till the node N of the other moving body M; $V_M$, speed toward the node N of the other moving body M; $L_{C2}$, distance till the node N of own vehicle C2; and $V_{C2}$, vehicle speed of the own vehicle C2.

In other words, the encounter determination unit 40 determines an encounter between the other moving body M and the own vehicle C2, based on moving body position data, moving body direction data, and moving body speed data of the other moving body M; vehicle position data, vehicle direction data, and vehicle speed data of the own vehicle C2; and position data of the node N in map data.

Meanwhile, when assuming a legal speed on a road, where the vehicle C2 is driving, to be V0, and V1=V0+∇V0 (∇V0 is 20% of V0), it is also enabled to substitute any one of the V0 and the V1 for the vehicle speed $V_{C2}$ of the own vehicle C2 in calculating the margin time Ts and the margin stop distance L. This is because such a case can be assumed that an actual measured value of a vehicle speed at that time is out of the V1 for some reason (for example, during deceleration due to passing a curve, and the like), and in such a case to perform the calculation with using any one of the V0 and the V1 can be thought preferable.

Then, in a case that the vehicle speed $V_{C2}$ of the vehicle C2 is larger than the V1, the character data generation unit 41b can also generate character data for informing a driver of it and display the character data in the display device 20.

A display example is, for example, "Speed is too fast," and the like. In addition, the voice data generation unit 41d can also generate voice data for informing a driver of a content similar to the character data and make the speaker 2 speak.

The encounter determination unit 40 determines a possibility of an encounter between the other moving body M and the own vehicle C2, separating the possibility into four steps, based on a value of the margin time Ts:

(1) In a case of the Ts≧30 sec the encounter determination unit 40 determines that there exists "no" possibility of the encounter between the other moving body M and the own vehicle C2.

(2) In a case of 20 sec≦the Ts≦30 sec the encounter determination unit 40 determines that there exists a "small" possibility of the encounter between the other moving body M and the own vehicle C2.

(3) In a case of 10 sec≦the Ts≦20 sec the encounter determination unit 40 determines that there exists a "middle" possibility of the encounter between the other moving body M and the own vehicle C2.

(4) In a case of the Ts<10 sec the encounter determination unit 40 determines that there exists a "large" possibility of the encounter between the other moving body M and the own vehicle C2.

Then the character data generation unit 41b and the voice data generation unit 41d generate character data and voice data, output them to the display device 20 and the speaker 21, respectively, and notify a driver of information shown in Table 1.

TABLE 1

| | Ts | | |
|---|---|---|---|
| Data | 20 to 30 sec | 10 to 20 sec | Less than 10 sec |
| Character Data | Deceleration Instruction | Slower Driving Instruction | Stop Instruction |
| Voice Data | Passing Direction Guidance of Other Moving-body | Passing State Guidance of Other Moving-body | Passing State Guidance of Other Moving-body |

As an example of the deceleration instruction can be cited "Please speed down." As an example of the slower driving instruction can be cited "Please drive at a slower speed." As an example of the stop instruction can be cited "Please stop."

As an example of the passing direction guidance of other moving body can be cited "A bicycle is approaching from left." As an example of the passing state guidance of other moving body can be cited "After X seconds, a bicycle proceeds into the front intersection from left."

The instructions to a driver and the guidances of the other moving body M are an example of data for informing a determination result by the encounter determination unit 40. Other than these, the voice data generation unit 41d may also generate voice data including instructions to a driver, and the character data generation unit 41b may also generate character data including the guidances (passing direction guidance, passing state guidance) of the other moving body M.

In addition, in a case that the margin time Ts is not more than five seconds, it is preferable that the control data generation unit 41e drives the in-vehicle apparatus 2, thereby makes a brake active, and stops own vehicle C2.

Meanwhile, even if the margin time Ts is within the range shown in Table 1, in a case that the distances $L_M$, $L_{C2}$ are out of the ranges shown in FIGS. 7A and 7B, it is preferable not to generate the alarms shown in Table 1. Meanwhile, using the distance $L_M$ is in a case that the other moving body M is a vehicle, and cases of such a bicycle and a human being are excluded.

This is because in a case that the distances $L_M$, $L_{C2}$ are too short (shorter than a first predetermined value), a driver does not afford to handle an alarm and there is a fear that a confusion is invited all the more even if the alarm is generated; in addition, this is because in a case that the distances $L_M$, $L_{C2}$ are too long (longer than a second predetermined value), a driver can handle even if an alarm is not generated. Whether or not considering the ranges of the distances $L_M$, $L_{C2}$ depends on driving roads of the vehicle C2 and the other moving body M; its relationship is shown in Table 2.

TABLE 2

| | Driving Class Rank | | |
|---|---|---|---|
| Vehicle | α1 | α2 | α3 |
| C1 (M) | National Road | National Road | Other than National Road |
| C2 | National Road | Other than National Road | National Road |
| Stop Distance Check | $L_M$, $L_{C2}$ | $L_M$ | $L_{C2}$ |

In addition, the encounter determination unit 40 may also be a configuration of changing the first predetermined value and the second predetermined value according to a driving environment. In this case it is preferable that a relationship between the first and second predetermined values and the driving environment is memorized in advance in the memory unit 23.

Subsequently, taking it as an example a case that the vehicle C1 and own vehicle C2 are set as an information sharing vehicle, an image display of the other moving body M in the own vehicle C2 will be described.

Figure 9:
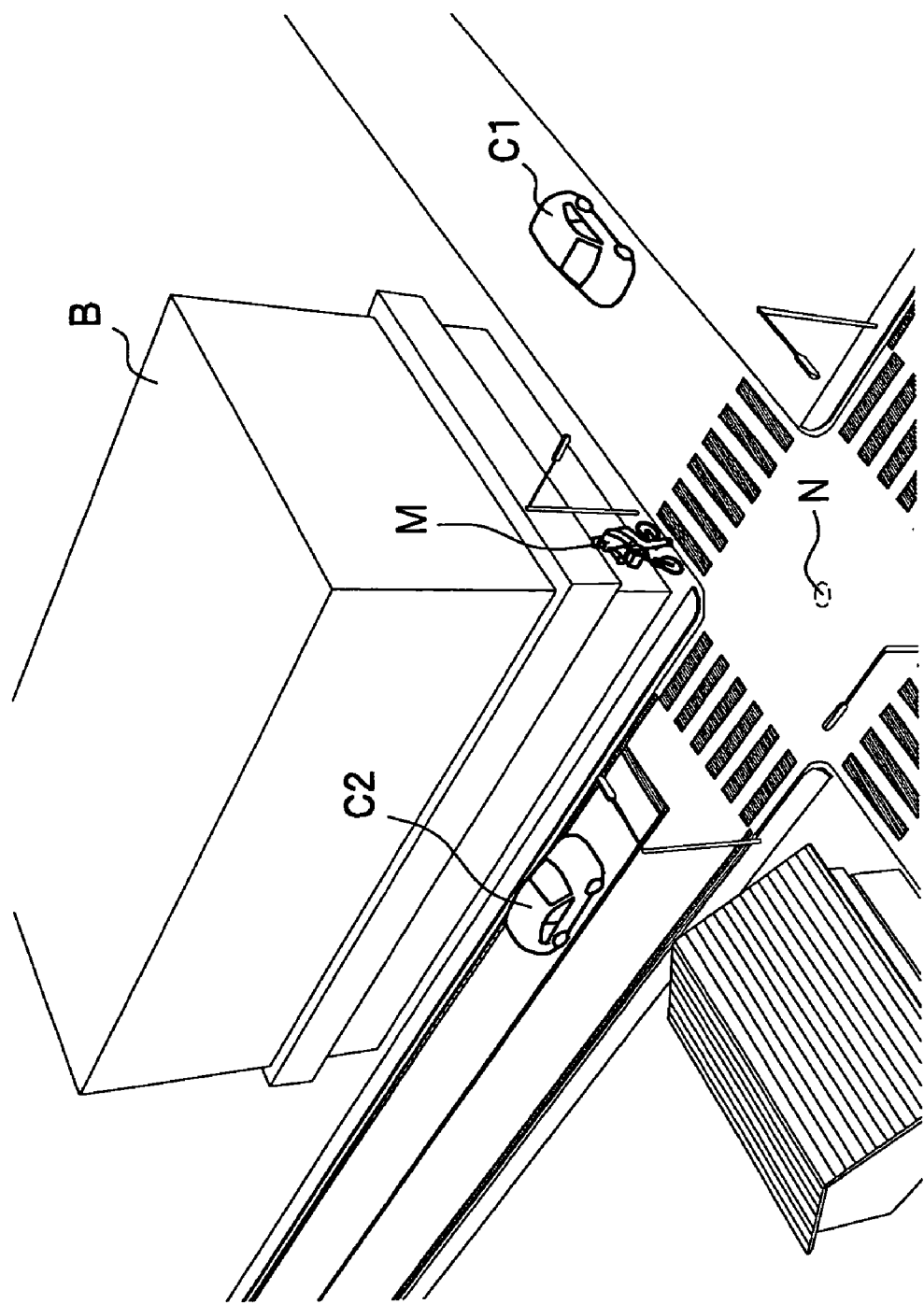
FIG. 9 is a drawing illustrating an action based on the first operation of a communication system between vehicles, and an arrangement state of vehicles C1 and C2 and a moving body M.
Figure 10:
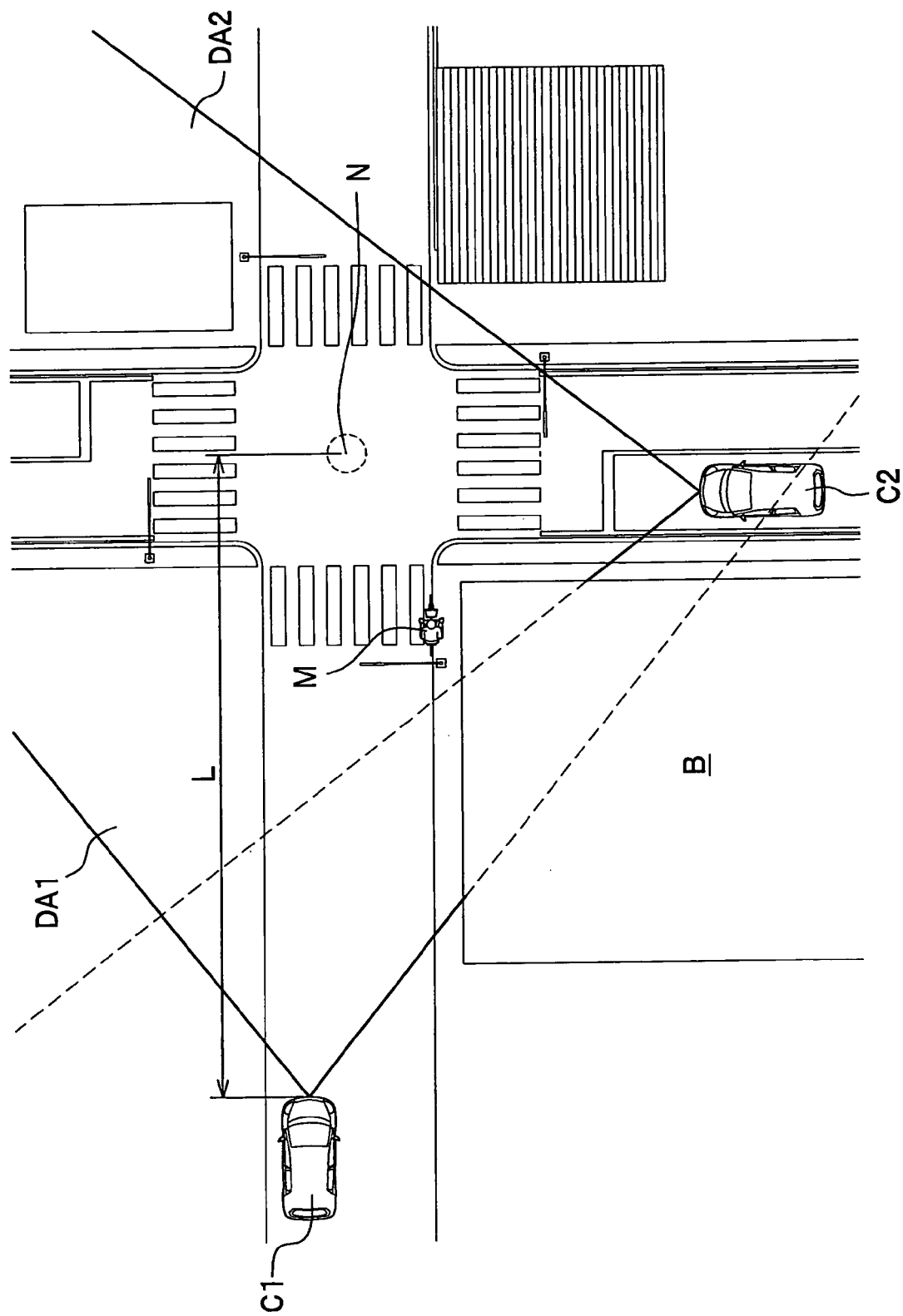
FIG. 10 is a plan view of FIG. 9.
Figure 11:
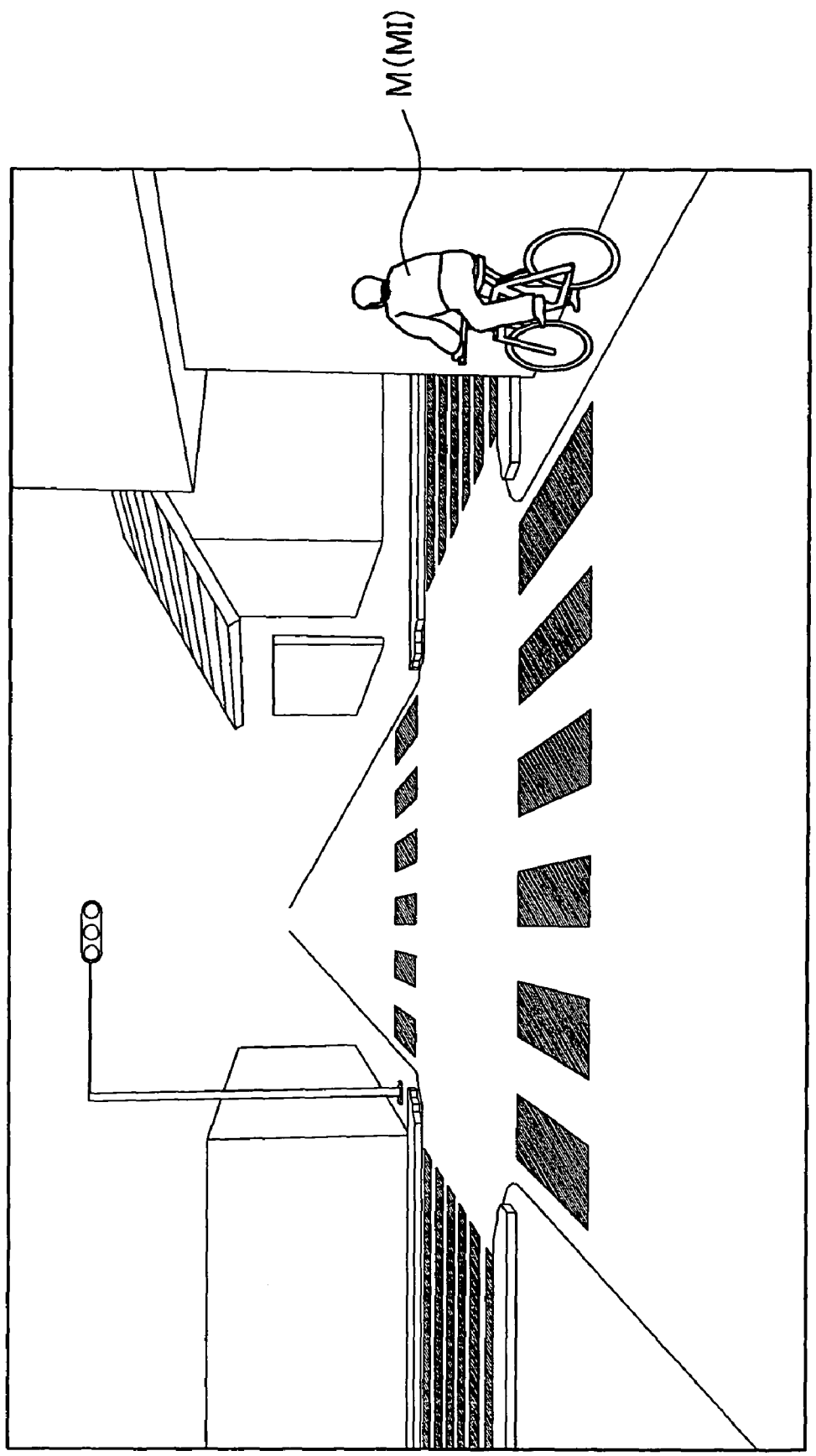
FIG. 11 is a drawing showing an image taken by a camera of the vehicle C1.
Figure 12:
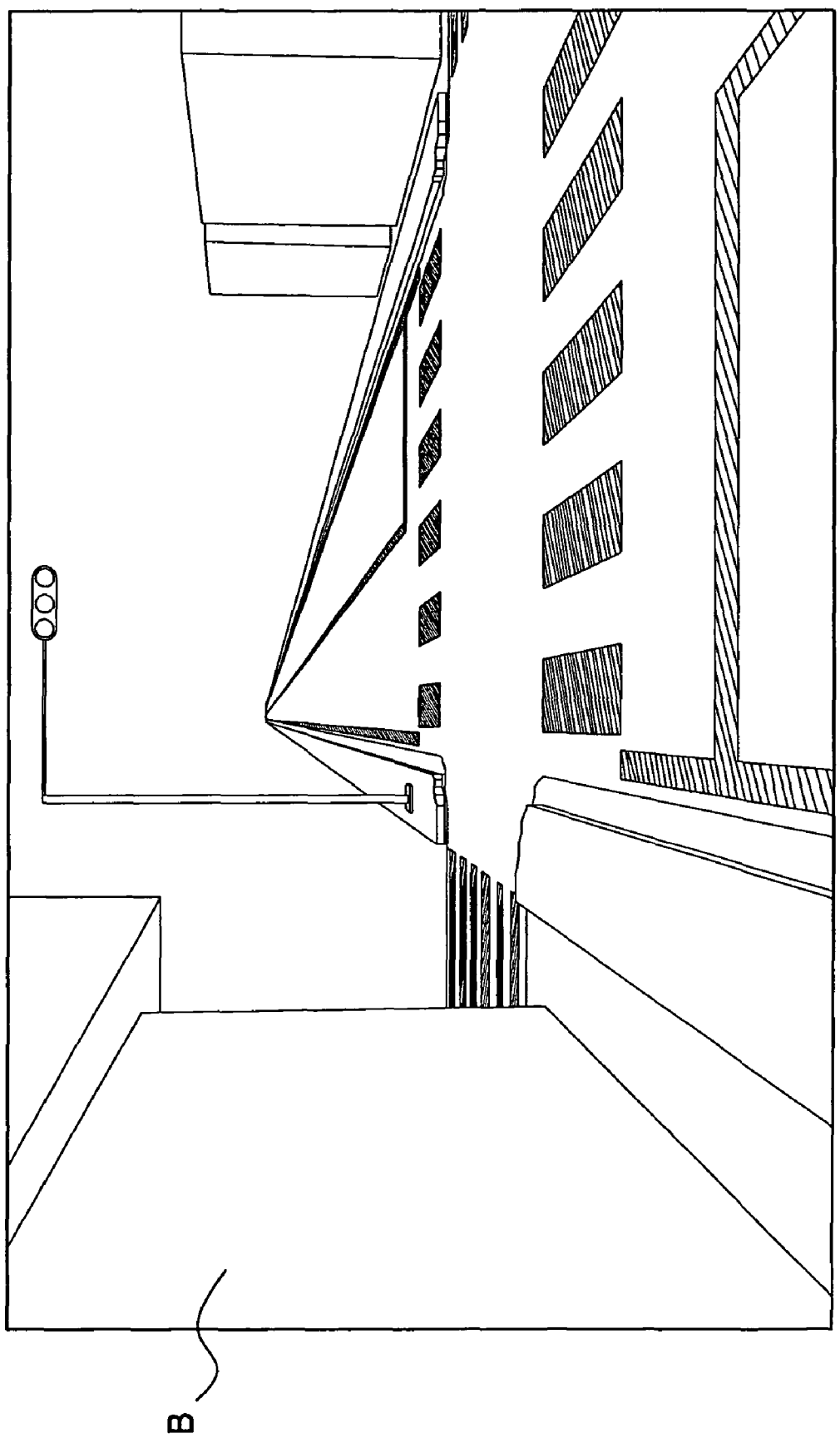
FIG. 12 is a drawing showing an image taken by a camera of the vehicle C2.
Figure 13B:
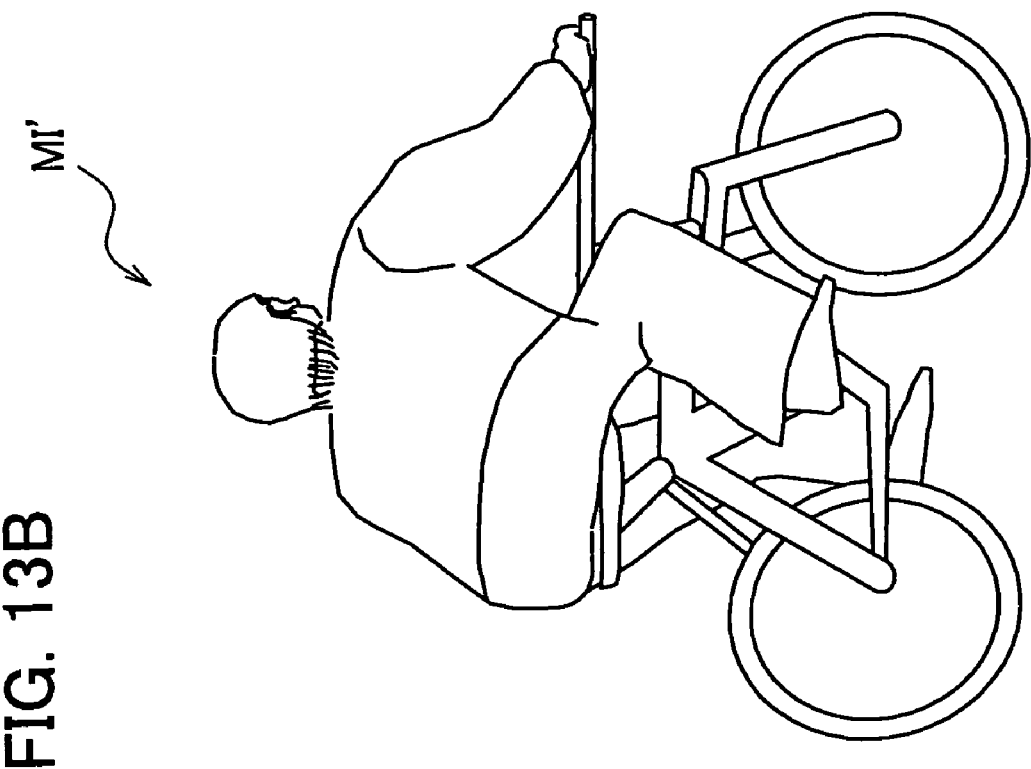
FIGS. 13A and 13B are drawings illustrating a compensation of moving body images.
Figure 13A:
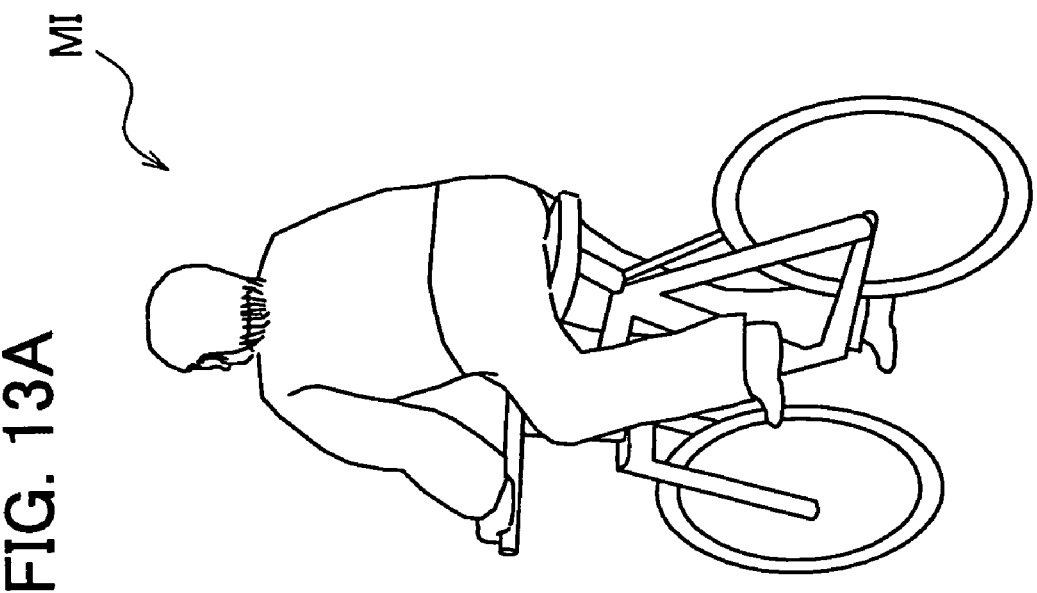

FIG. 9 is a drawing illustrating an action based on the first operation of the communication system 1 between vehicles, and an arrangement state of the vehicle C1 and the own vehicle C2 and other moving body M. FIG. 10 is a plan view of FIG. 9. FIG. 11 is a drawing showing an image taken by cameras of the vehicle C1. FIG. 12 is a drawing showing an image taken by cameras of the own vehicle C2. FIGS. 13A and 13B are drawings illustrating compensation images of the moving body M; FIG. 13A is a drawing illustrating an image before a compensation; and FIG. 13B is a drawing illustrating an image after the compensation. FIG. 14 is a drawing illustrating an image where an image of the moving body M taken by the vehicle C1 is combined with that of the own vehicle C2.

As shown in FIGS. 9 and 10, the vehicle C1 is driving toward the node N. In addition, the own vehicle C2 is driving toward the node N on a road (arc) different from that of the vehicle C1. In addition, the moving body M is driving toward the node N on the road (arc) same as that of the vehicle C1.

As shown in FIG. 11, the cameras 11, 11 of the vehicle C1 have taken an image of the moving body M, and the object detection unit 32 has detected a moving body image MI of the moving body M.

In addition, as shown in FIG. 12, the cameras 11, 11 of the own vehicle C2 cannot take an image of the moving body M because a building B becomes an obstacle.

Consequently, the moving body image MI taken by the object detection unit 32 of the vehicle C1 is transmitted to the in-vehicle apparatus 2 of the own vehicle C2 via the vehicle control apparatus 3. The image data generation unit 41a of the own vehicle C2 generates a compensated other-moving-body image MI' shown in FIG. 13B, based on vehicle position data of the vehicle C1, that of the own vehicle C2, and relative position data of the moving body (other moving body) M. Here, using the vehicle position data of the vehicle C1 is because a compensation way (with or without reversion and the like) changes according to a relationship between the vehicle C1 and the own vehicle C2. Then the image data generation unit 41a of the own vehicle C2 generates image data where the image taken by the cameras 11, 11 and the other-moving-body image MI' are combined, and as shown in FIG. 14, displays it in the display device 20. Here, the image data generation unit 41a decides a combination position of the other-moving-body image MI', based on other-moving-body estimation data, and in a case of assuming that there exists no building B, generates image data of which an image is similar to that of the other moving body M taken directly by the cameras 11, 11 of the own vehicle C2.

Thus the other moving body M that cannot be detected by the own vehicle C2 is made to be displayed in the display device 20 of the own vehicle C2, and thereby, can be informed to a driver of the own vehicle C2.

In addition, the voice data generation unit 41d of the own vehicle C2 generates voice data for informing a driver of the own vehicle C2 of an existence of the other moving body M by voice, and makes the speaker 21 speak.

An example of speaking is "There exists a bicycle in left front," and the like.

Thus the other moving body M that cannot be detected by the own vehicle C2 can be informed to a driver of the own vehicle C2 by voice.

In addition, the character data generation unit 41b displays a determination result of the encounter determination unit 40 in the display device 20 as a character.

In addition, the voice data generation unit 41d makes the speaker 21 speak a determination result of the encounter determination unit 40 as a <Timing Chart>

Figure 15:
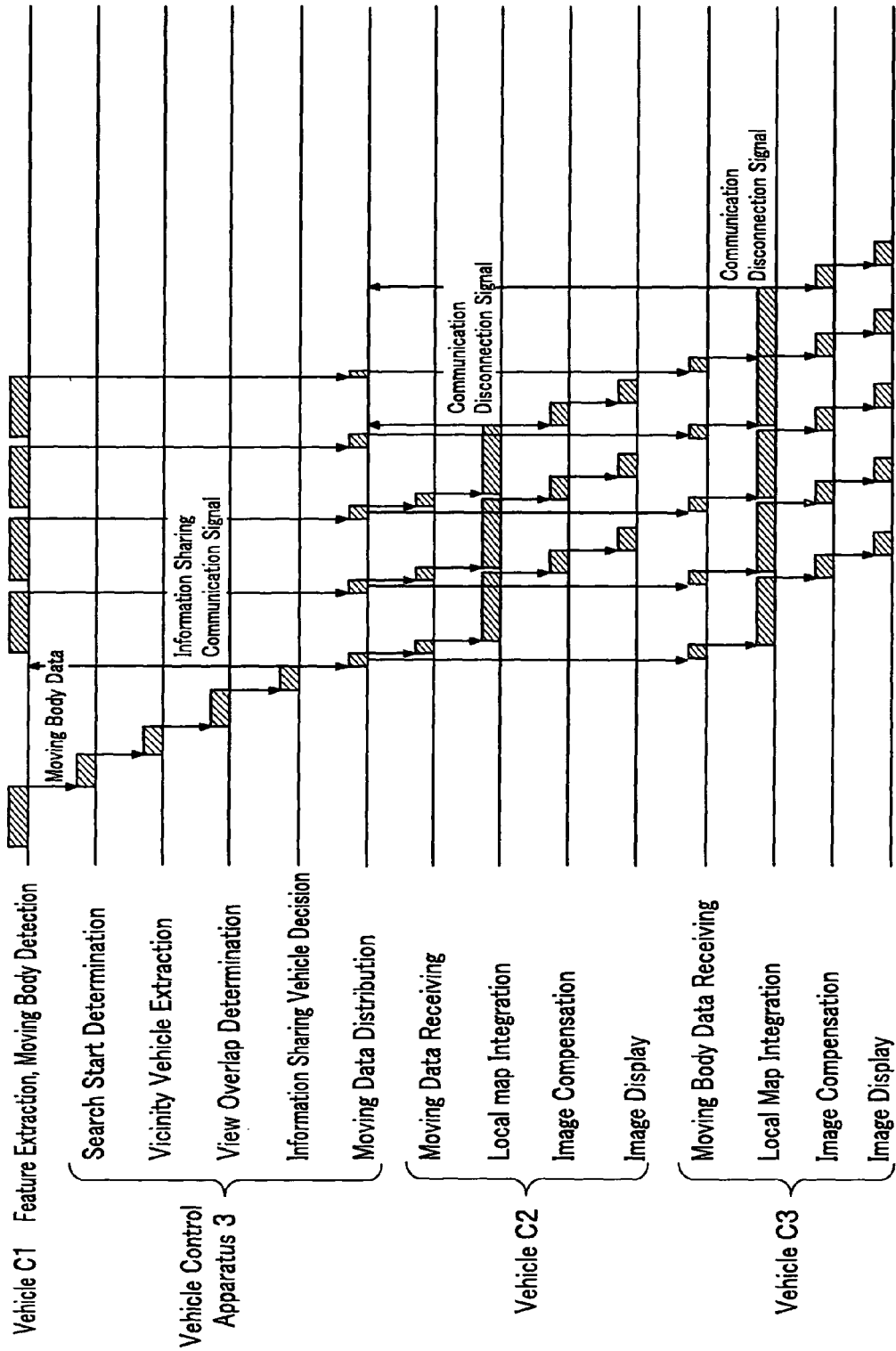
FIG. 15 is a timing chart showing a communication between an in-vehicle apparatus and a vehicle control apparatus in the first operation example of a communication system between vehicles.

FIG. 15 is a timing chart showing a communication between the in-vehicle apparatus 2 and the vehicle control apparatus 3 in the first operation example of the communication system 1 between vehicles.

Firstly, the in-vehicle apparatus 2 of the vehicle C1 extracts a feature and detects an object with respect to a front image. Then the in-vehicle apparatus 2 of the vehicle C1 transmits moving body data of a kind of object data to the vehicle control apparatus 3.

The vehicle control apparatus 3 that has received the moving body data performs a search start determination, a vicinity vehicle extraction, a view overlap determination, and an information sharing vehicle decision in this order, and transmits other-moving-body data and an information sharing communication signal to vehicles C (here, the vehicles C2, C3) decided as an information sharing vehicle.

The in-vehicle apparatuses 2 of the vehicles C2, C3 that have received the other-moving-body data perform a local map integration, an image compensation, and an image display in this order with respect to the other-moving-body data.

Then, if once decided as the information sharing vehicle, after then, the vehicle control apparatus 3 can also omit the search start determination, the vicinity vehicle extraction, and the information sharing vehicle decision. Meanwhile, a configuration not omitting these is also available.

In addition, the in-vehicle apparatuses 2 of the vehicles C2, C3 transmit a communication disconnection signal to the vehicle control apparatus 3 when own cameras 11, 11 result in taking an image of other moving body. Such a communication disconnection signal is generated and output by the object data notification unit 34.

In addition, the vehicle control apparatus 3 may also be a configuration of transmitting the communication disconnection signal to the in-vehicle apparatuses 2 of the vehicles C1, C2, C3 when no overlap between image taken areas by the vehicle C1 and the vehicles C2, C3 results in existing.

As described above, the communication system 1 receives data with respect to the moving body M, which the in-vehicle apparatus 2 of the own vehicle C2 cannot detect by itself, from the vehicle C1, thereby can display the other moving body M in the display device 20 of the own vehicle C2, and can make the speaker 21 of the own vehicle C2 speak an existence and existing position of the own moving body M.

In addition, the communication system 1 can determine an encounter between the own vehicle C2 and the own moving body M and output the determination result to the in-vehicle apparatus 2 and speaker 21 of the own vehicle C2.

Accordingly, the communication system 1 can inform a driver of the own vehicle C2 of the existence and existing position of the own moving body M, using at least one of an image, a character, and a voice.

In addition, communication system 1 can inform a driver of the own vehicle C2 of a possibility of encountering the own moving body M, using at least one of an image, a character, and a voice.

<Second Operation Example of Communication System between Vehicles>

Subsequently will be described a second operation example of the communication system 1 between vehicles.

Meanwhile, because an operation example of the vehicle control apparatus 3 is same as shown in FIG. 5, only that of the in-vehicle apparatus 2 will be described.

<Second Operation Example of In-Vehicle Apparatus>

Figure 16:
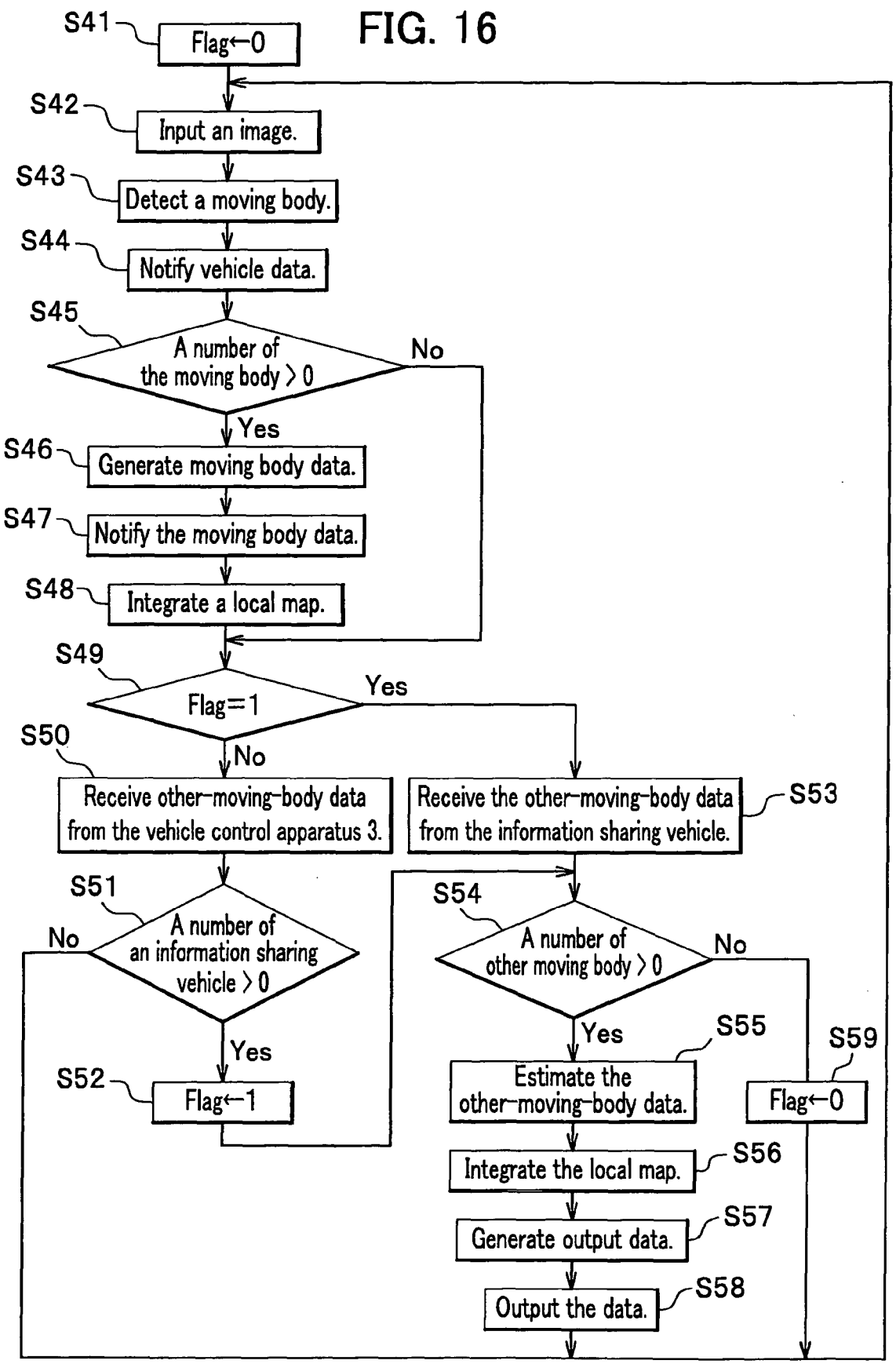
FIG. 16 is a flowchart describing a second operation example of an in-vehicle apparatus.

A second operation example of the in-vehicle apparatus 2 will be described. FIG. 16 is a flowchart describing the second operation example of the in-vehicle apparatus 2.

Firstly, the object data notification unit 34 sets a flag to "0" (step S41).

The flag defines a communication opponent with the in-vehicle apparatus 2, and in a case that the flag is "0," the in-vehicle apparatus 2 and the vehicle control apparatus 3 are connected. In addition, in a case that the flag is "1," the in-vehicle apparatus 2 and the vehicle control apparatus 3 are disconnected, and the in-vehicle apparatus 2 of own vehicle C and those of other vehicles C are connected. These connection/disconnection are performed by well known technology.

Because steps S42 to S48 are same operations as in the steps S2 to S8 of FIG. 4, descriptions thereof will be omitted.

After an end of the processing till the step S48, in a case that the flag is "0" (No in a step S49), the data receiving unit 37 receives (step S50) other-moving-body data and an information sharing vehicle notification signal from the vehicle control apparatus 3.

In a case that there exists an information sharing vehicle (Yes in a step S51), the object data notification unit 34 sets the flag to "1" (step S52).

In addition, in a case of Yes in the step S49, the data receiving unit 37 receives the other-moving-body data from the information sharing vehicle (step S53).

Then after any one of the steps S52 and S53, in a case that there exists the other-moving-body data (Yes in a step S54), steps S55 to S58 are processed. Because the steps S55 to S58 are same operations as in the steps S11 to S14 of FIG. 4, descriptions thereof will be omitted.

In a case of No in the step S54, the object data notification unit 34 sets the flag to "0" (step S59). In a case of No in the step S51, the processing moves to the step S42 after processing any one of the steps S58 and S59, and a series of the processing is repeated.

Thus each vehicle once set as an information sharing vehicle can communicate with each other not via the vehicle control apparatus 3. Accordingly, it is enabled to shorten time requested for a communication of the other-moving-body data.

<Third Operation Example of Communication System between Vehicles>

Figure 17:
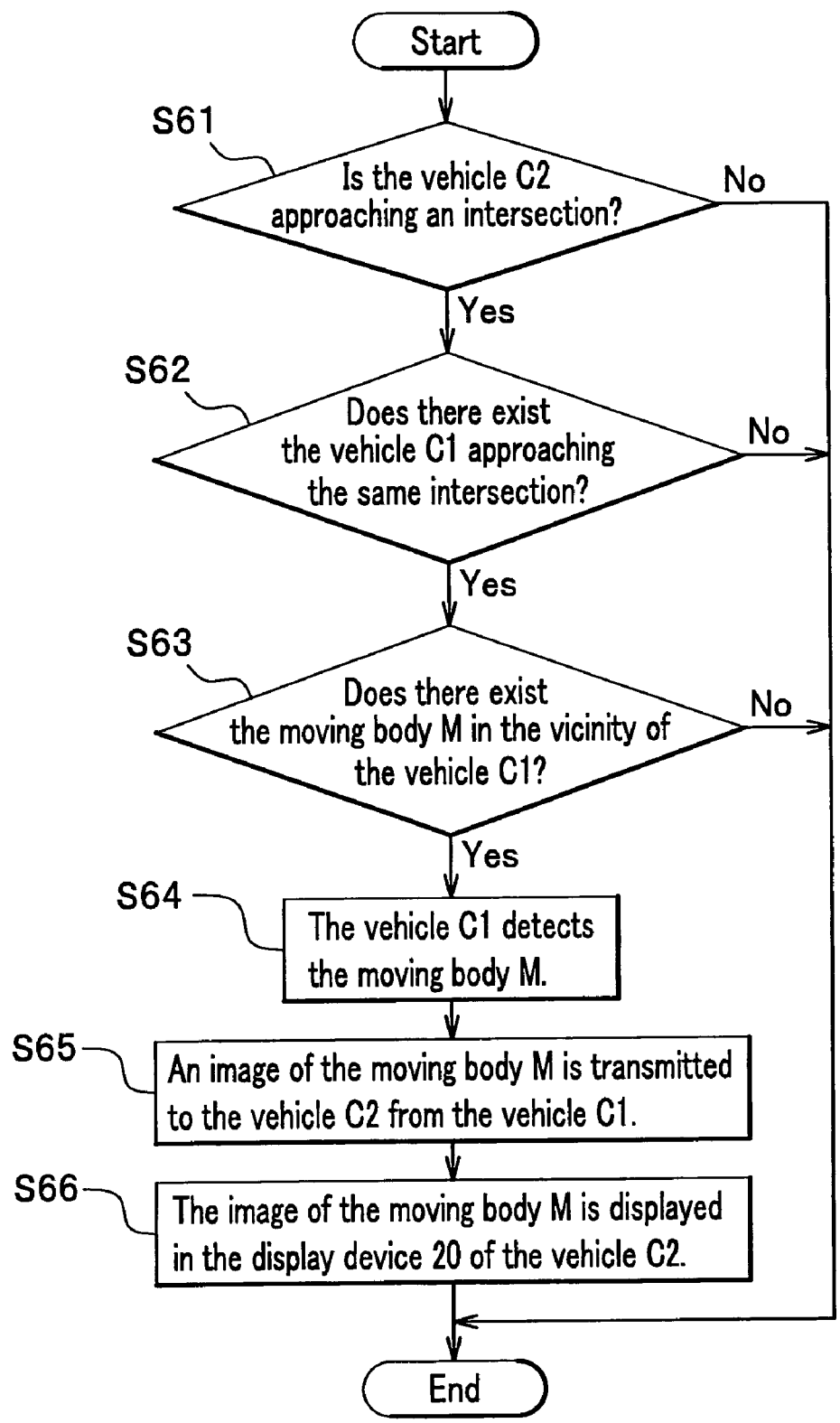
FIG. 17 is a flowchart describing a third operation example of a communication system between vehicles.

Subsequently will be described a third operation example of the communication system 1 between vehicles. FIG. 17 is a flowchart describing the third operation example of the communication system 1 between vehicles. Meanwhile, the third operation example is applied to the state shown in FIGS. 9 and 10.

When the vehicle C2 is approaching the node (intersection) N, the search start determination unit 54 determines (Yes in a step S61) to start searching, based on vehicle data transmitted from each vehicle C, and the vicinity vehicle extraction unit 55 determines (step S62) whether or not there exists a vehicle approaching the same node N.

In a case that vicinity vehicle extraction unit 55 extracts (Yes in the step S62) the vehicle C1, the information sharing vehicle decision unit 57 decides the vehicles C1, C2 as an information sharing vehicle, and the information sharing vehicle notification unit 58 notifies the vehicles C1, C2 of an information sharing communication signal.

Then in a case (Yes in a step S63) that the moving body M exists in the vicinity of the vehicle C1, the object detection unit 32 of the vehicle C1 detects (step S64) the moving body M, and the object data notification unit 34 of the vehicle C1 notifies (step S65) the in-vehicle apparatus 2 of the vehicle C2 of moving body data with respect to the moving body M.

Then the display device 20 of the vehicle C2 displays (step S66) the moving body (other moving body) M.

Meanwhile, operation examples after the third operation example can also notify a position of the moving body M by voice, and an encounter determination result by any one of a voice, an image, and a character.

<Fourth Operation Example of Communication System between Vehicles>

Figure 18:
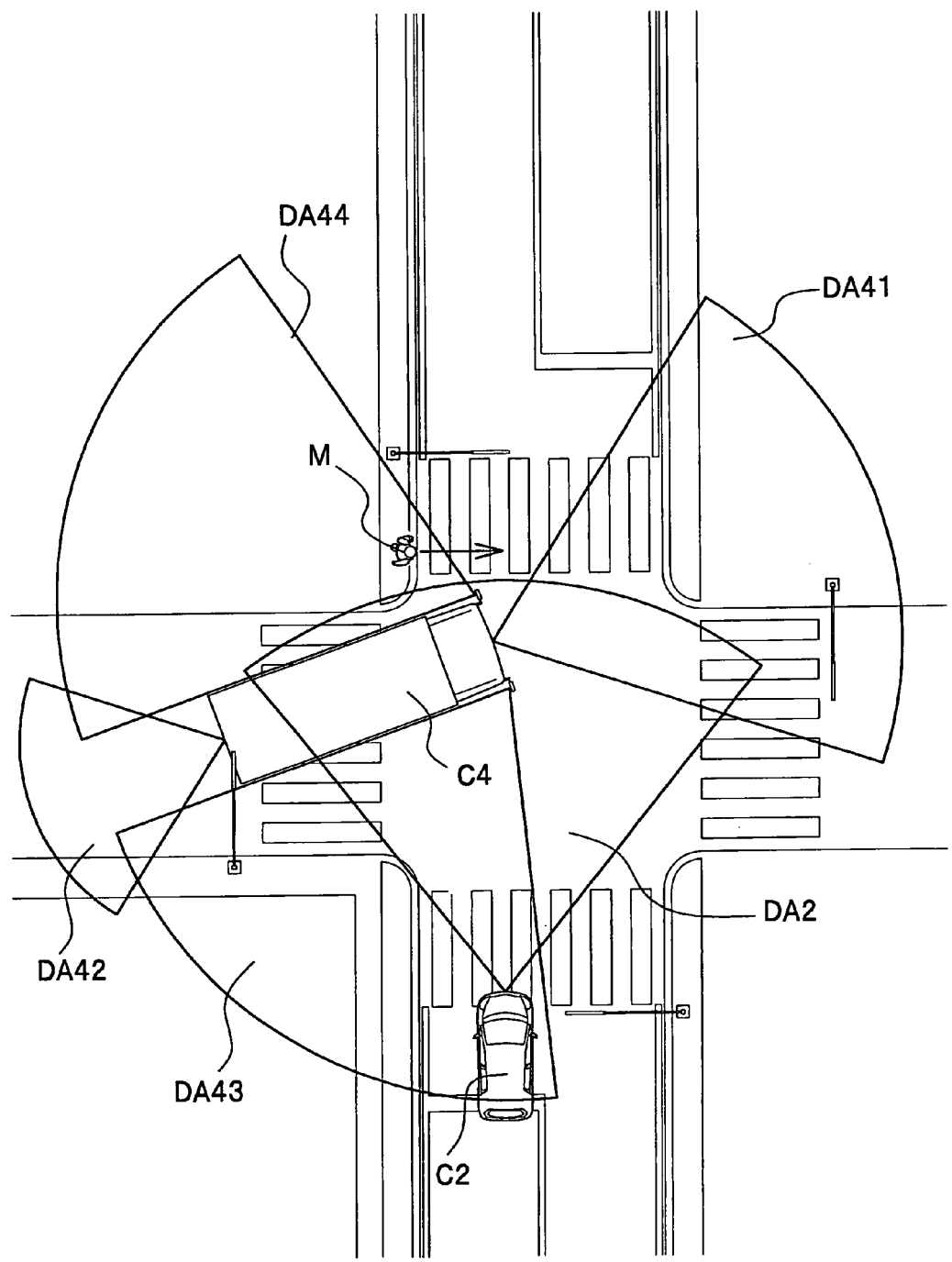
FIG. 18 is a state illustration drawing illustrating a fourth operation example of a communication system between vehicles.
Figure 19:
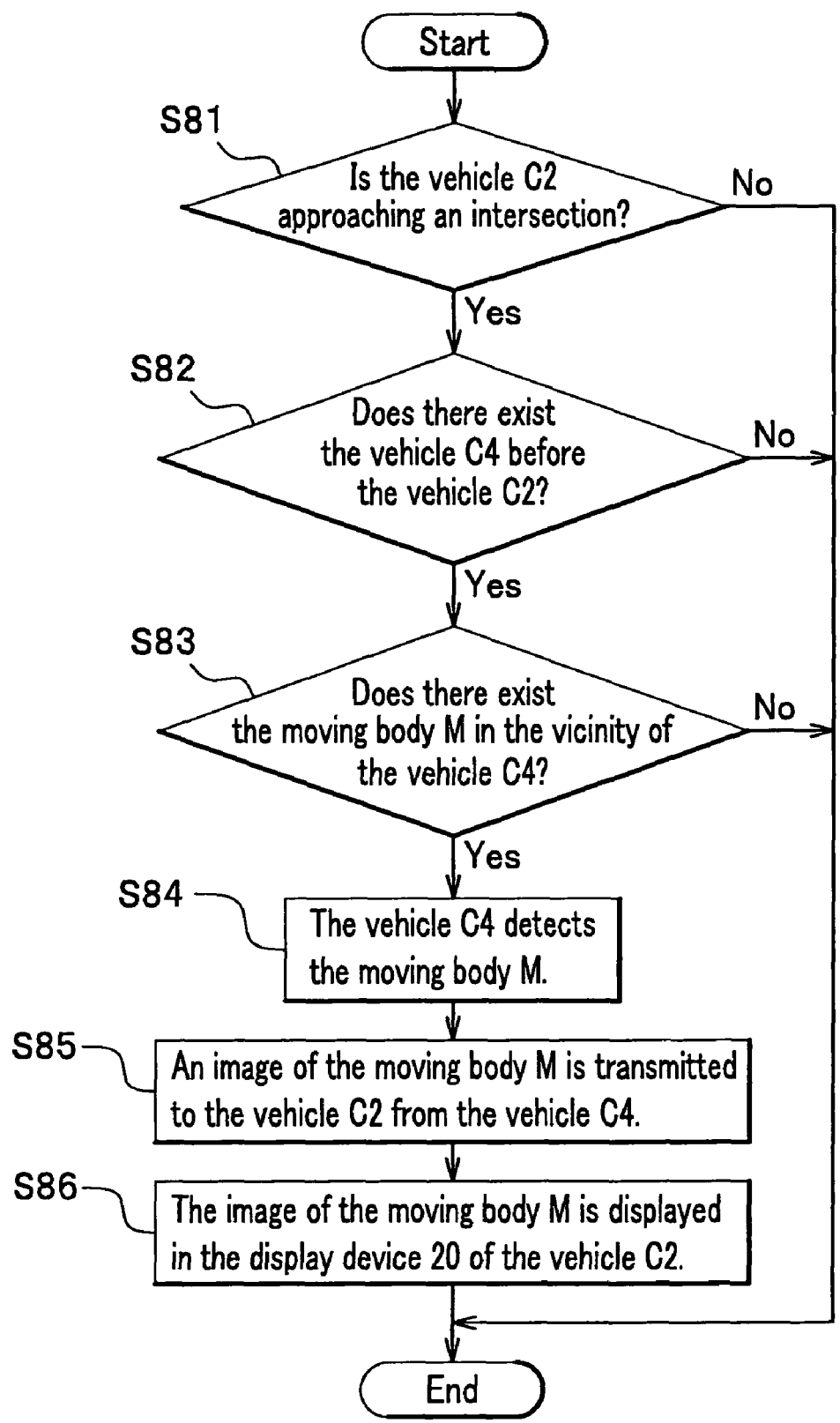
FIG. 19 is a flowchart describing the fourth operation example of a communication system between vehicles.

Subsequently will be described a fourth operation example of the communication system 1 between vehicles. FIG. 18 is a state illustration drawing illustrating the fourth operation example of the communication system 1 between vehicles. FIG. 19 is a flowchart describing the fourth operation example of the communication system 1.

The fourth operation example is applied, as shown in FIG. 18, to a case that a vehicle C4 of a larger vehicle such as a truck is proceeding into an intersection. The in-vehicle apparatus 2 of the vehicle C4 comprises respective cameras for taking images of front, rear, left side, and right side thereof, and is designed to be able to take images of image taken areas DA41, DA42, DA43, and DA44.

Firstly, in a case that the search start determination unit 54 determines (Yes in a step S81) that the vehicle C2 is approaching the node, the vicinity vehicle extraction unit 55 determines (step S82) whether or not there exists a vehicle before the vehicle C2.

Then in a case (Yes in the step S82) that there exists the vehicle C4 in the vicinity of the vehicle C2, the information sharing vehicle decision unit 57 decides the vehicles C2, C4 as an information sharing vehicle, and the information sharing vehicle notification unit 58 notifies the vehicles C2, C4 of an information sharing communication signal.

Then in a case (Yes in a step S83) that there exists the moving body M in the vicinity of the vehicle C4, the object detection unit 32 of the vehicle C4 detects (step S84) the moving body M, the object data notification unit 34 of the vehicle C4 notifies (step S85) the in-vehicle apparatus 2 of the vehicle C2 of moving body data with respect to the moving body M.

Then the display device 20 of the vehicle C2 displays (step S86) the moving body (other moving body) M.

Meanwhile, instead of determining the approach into the intersection in the step S81, it is also available to determine an approach into a crossing.

In addition, in the determinations of the steps S81 and S82 may also be used a detection result of the object detection unit 32 in the in-vehicle apparatus 2 of the vehicle C2.

In addition, in operation examples after the fourth operation example, the information sharing vehicle decision unit 57 can decide an information sharing vehicle without determining an overlap between image taken areas.

<Fifth Operation Example of Communication System between Vehicles>

Figure 20:
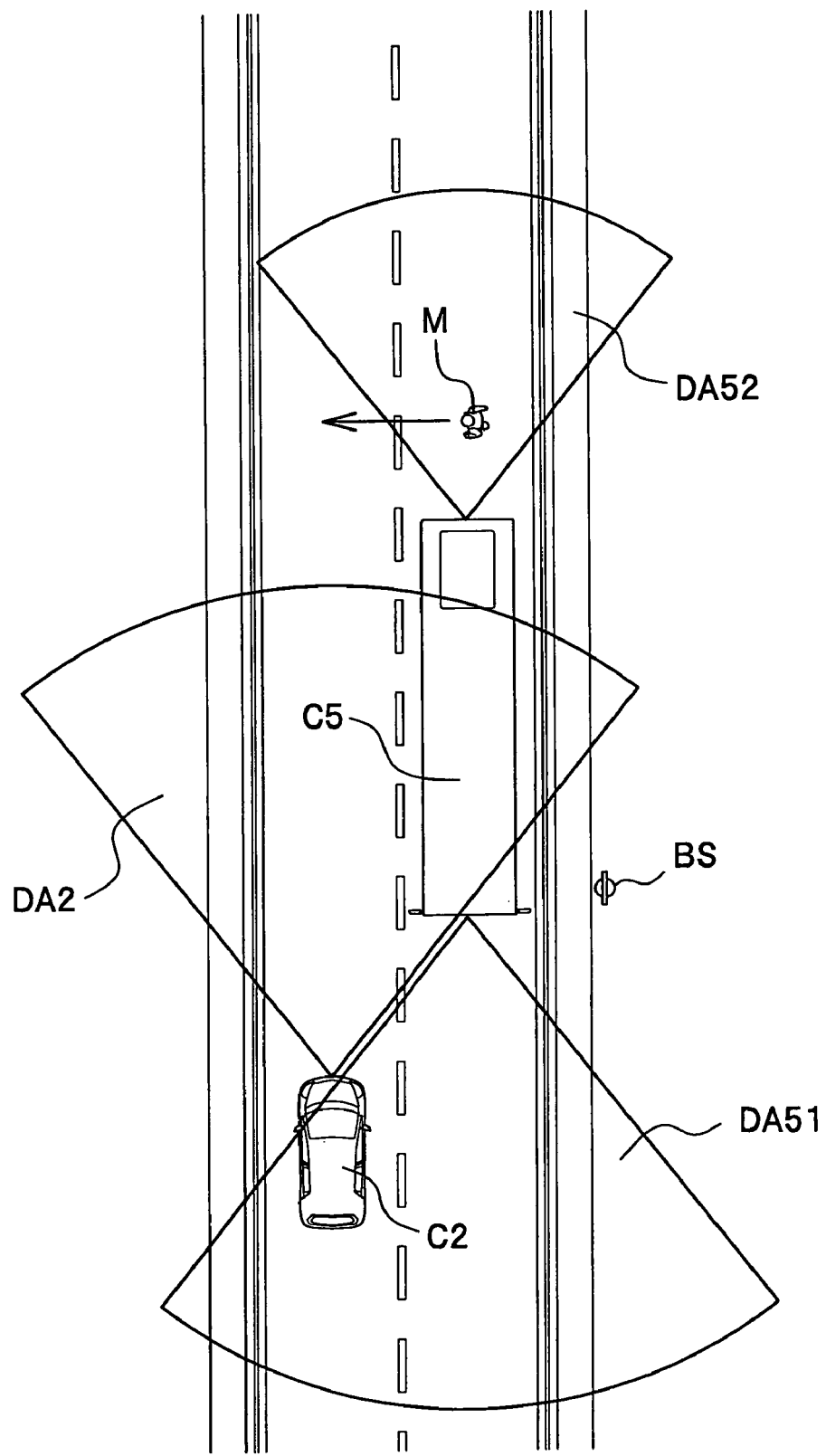
FIG. 20 is a state illustration drawing illustrating a fifth operation example of a communication system between vehicles.
Figure 21:
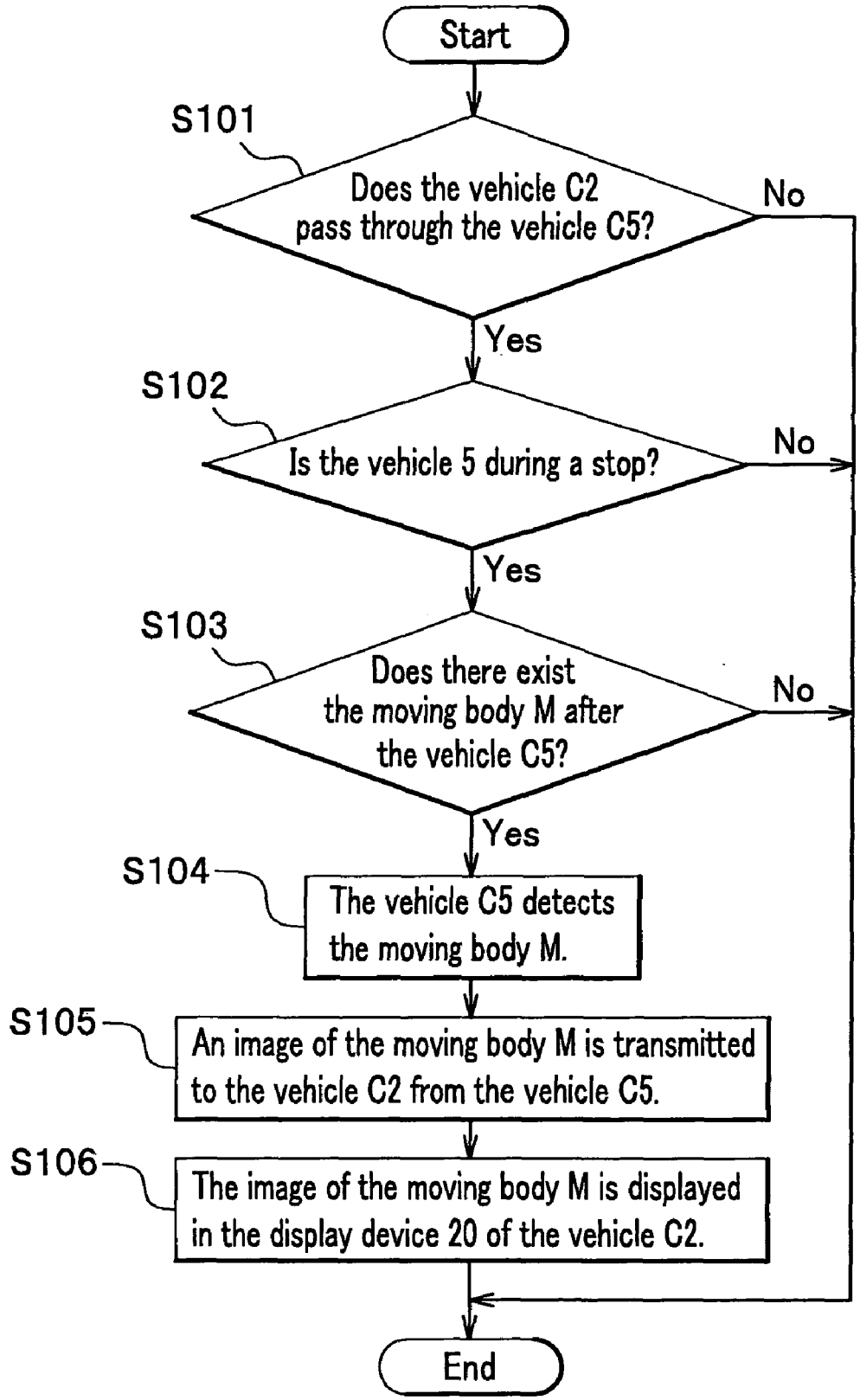
FIG. 21 is a flowchart describing the fifth operation example of a communication system between vehicles.

Subsequently will be described a fifth operation example of the communication system 1 between vehicles. FIG. 20 is a state illustration drawing illustrating the fifth operation example of the communication system 1 between vehicles. FIG. 21 is a flowchart describing the fifth operation example of the communication system 1 between vehicles.

The fifth operation example is applied, as shown in FIG. 20, to a case that a vehicle C5 of a bus stops at a bus stop BS at an opposite lane side of the vehicle C2. The in-vehicle apparatus 2 of the vehicle C5 comprises respective cameras for taking images of front and rear thereof, and is designed to be able to take images of image taken areas DA51, DA52.

Firstly, in a case that the search start determination unit 54 determines that the vehicle C2 and the vehicle C5 are going to pass through (Yes in a step S101) and the vehicle C5 is during a stop (Yes in the step S101), the information sharing vehicle decision unit 57 decides the vehicles C2, C5 as an information sharing vehicle.

Then in a case (Yes in a step S103) that there exists the moving body M in the vicinity of the vehicle C5, the object detection unit 32 of the vehicle C5 detects (step S104) the moving body M, the object data notification unit 34 of the vehicle C5 notifies (step S105) the in-vehicle apparatus 2 of the vehicle C2 of moving body data with respect to the moving body M.

Then the display device 20 of the vehicle C2 displays (step S106) the moving body (other moving body) M.

<Sixth Operation Example of Communication System between Vehicles>

Figure 22:
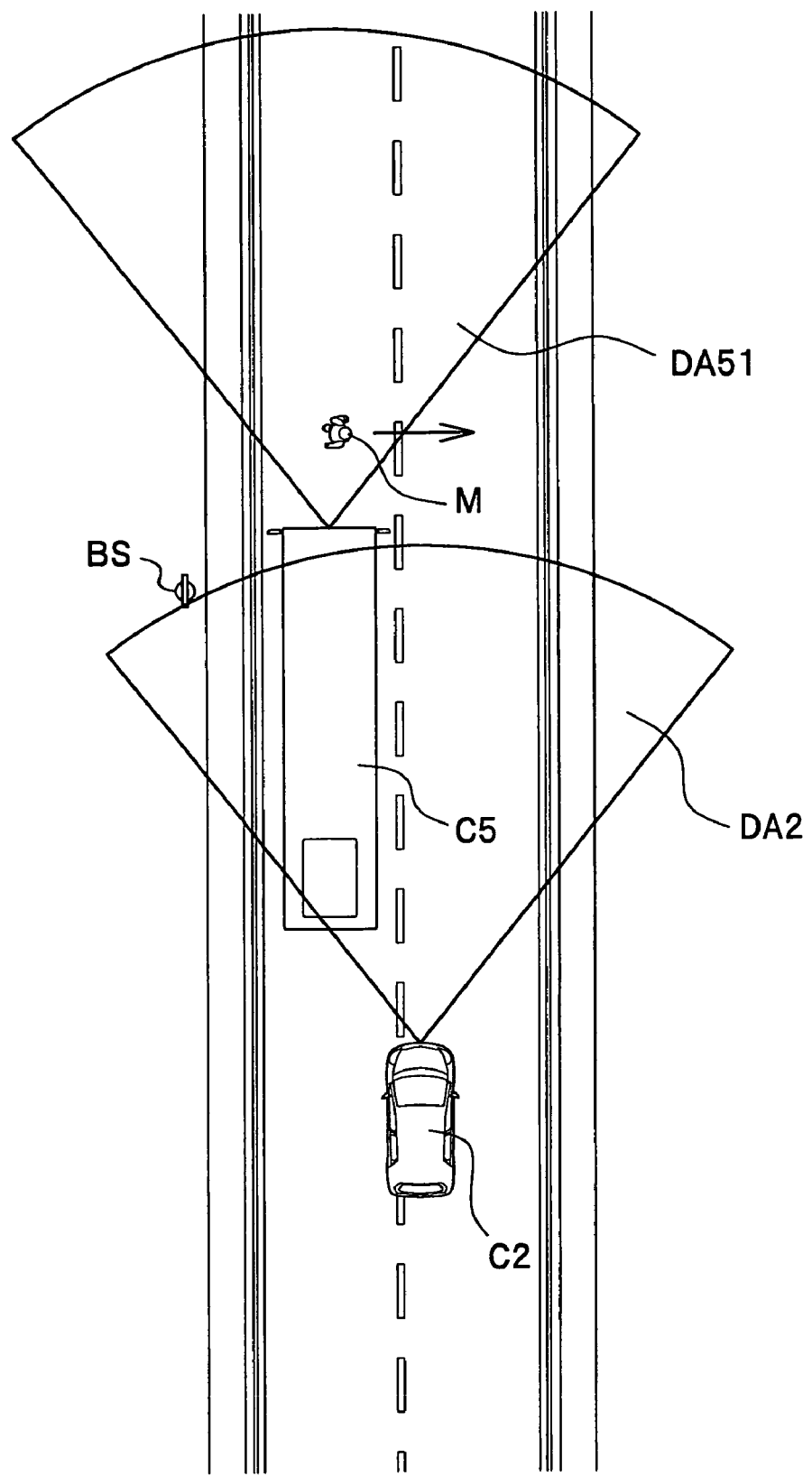
FIG. 22 is a state illustration drawing illustrating a sixth operation example of a communication system between vehicles.
Figure 23:
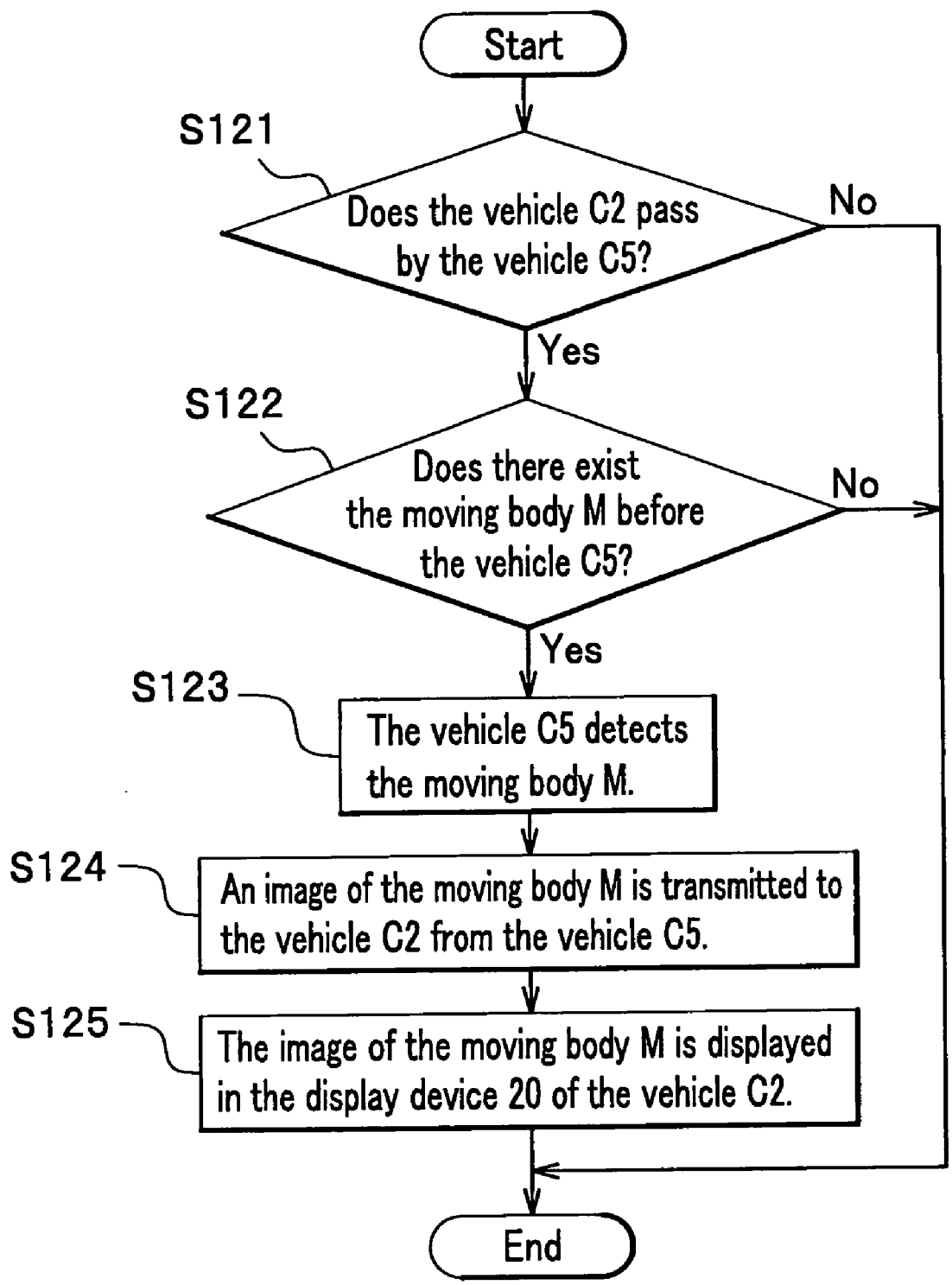
FIG. 23 is a flowchart describing the sixth operation example of a communication system between vehicles.

Subsequently will be described a sixth operation example of the communication system 1 between vehicles. FIG. 22 is a state illustration drawing illustrating the sixth operation example of the communication system 1 between vehicles. FIG. 23 is a flowchart describing the sixth operation example of the communication system 1.

The sixth operation example is applied, as shown in FIG. 22, to a case that the vehicle C2 is going to pass by the vehicle C5 of a bus during a stop.

Firstly, in a case that the search start determination unit 54 determines (Yes in a step S121) that the vehicle C2 is going to pass by the vehicle C5, the information sharing vehicle decision unit 57 decides the vehicles C2, C5 as an information sharing vehicle.

Then in a case (Yes in a step S122) that there exists the moving body M in the vicinity of the vehicle C5, the object detection unit 32 of the vehicle C5 detects (step S123) the moving body M, and the object data notification unit 34 of the vehicle C5 notifies (step S124) the in-vehicle apparatus 2 of the vehicle C2 of moving body data with respect to the moving body M.

Then the display device 20 of the vehicle C2 displays (step S125) the moving body (other moving body) M.

<Seventh Operation Example of Communication System between Vehicles>

Figure 24:
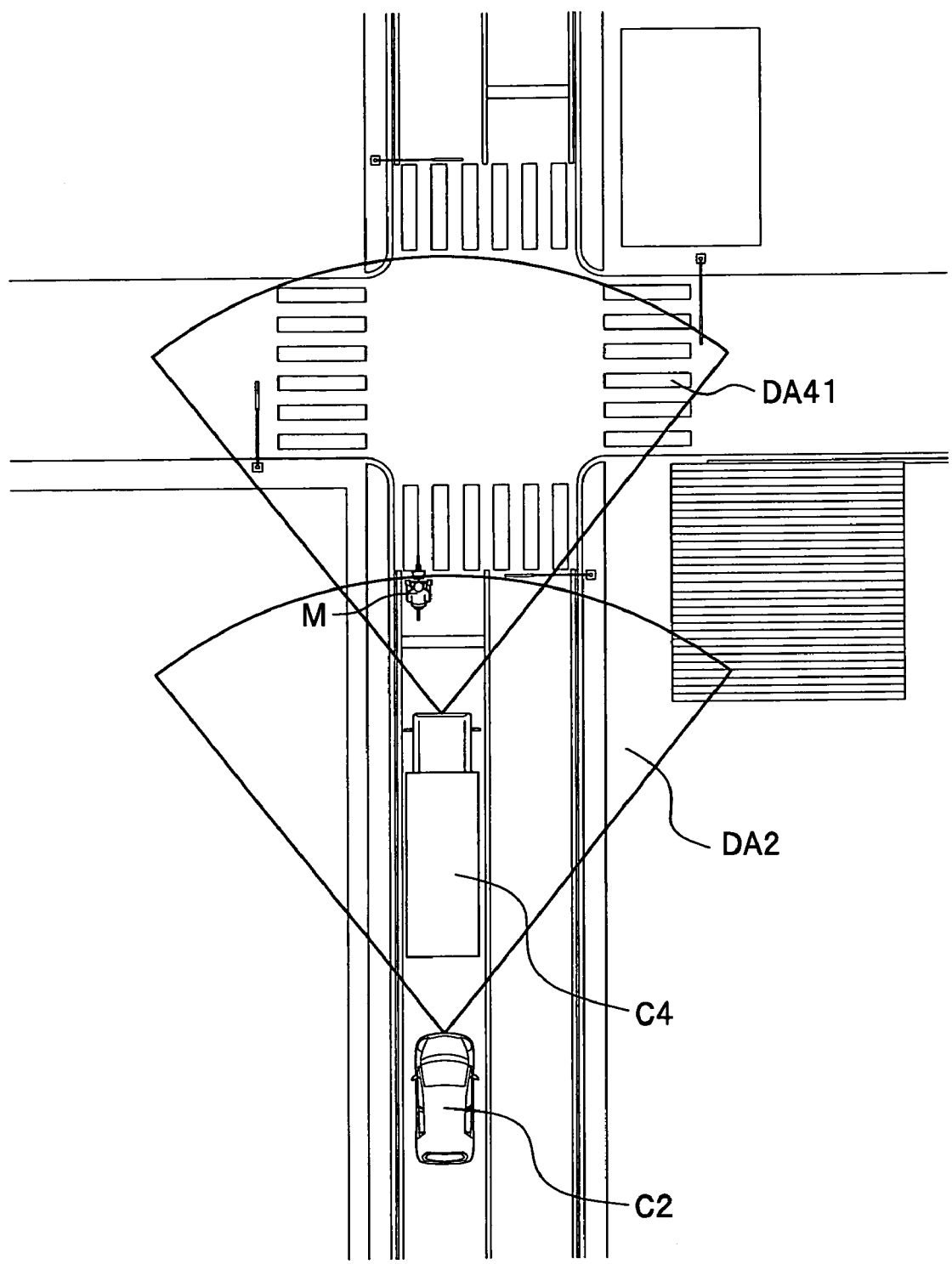
FIG. 24 is a state illustration drawing illustrating a seventh operation example of a communication system between vehicles.
Figure 25:
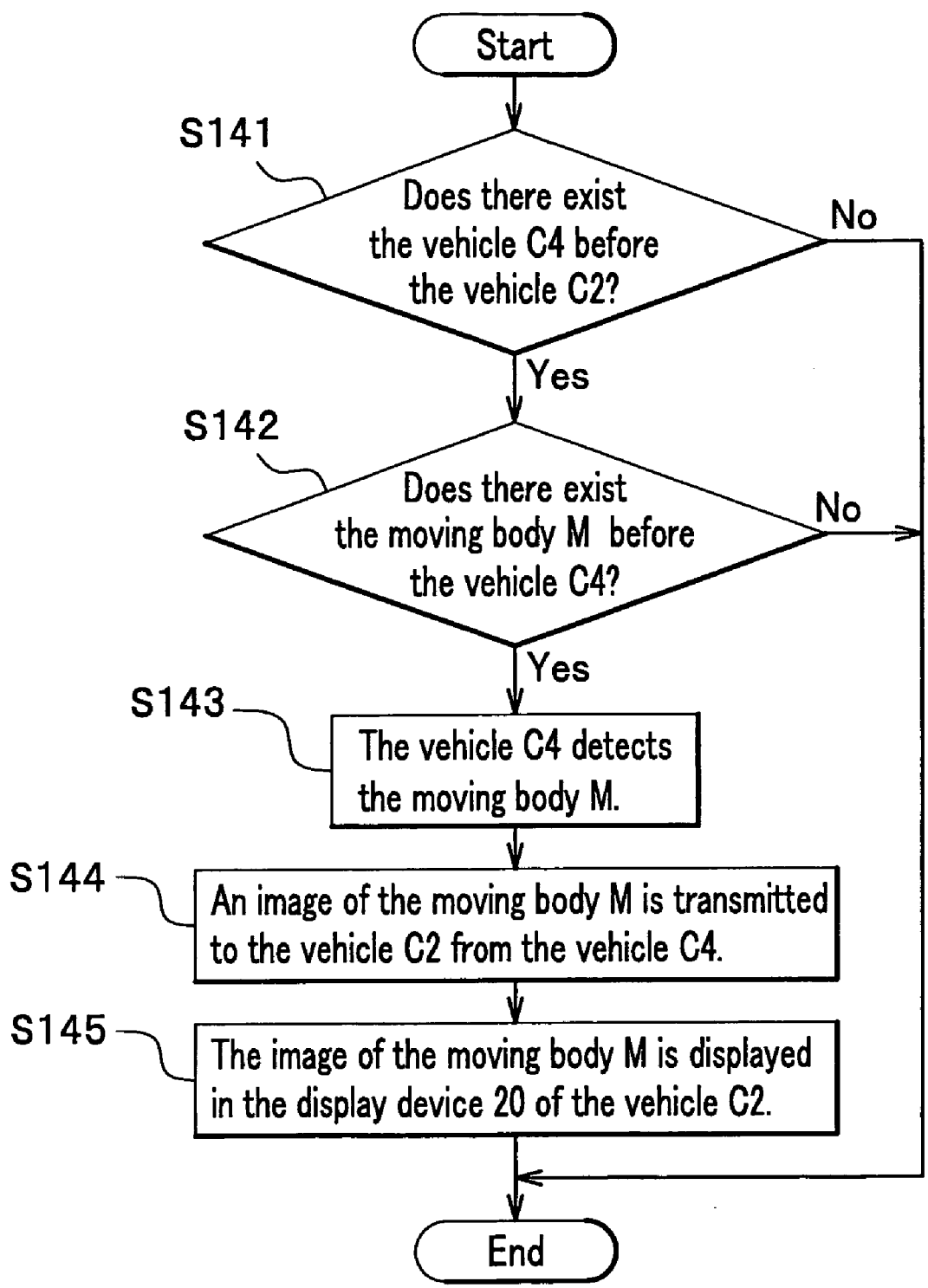
FIG. 25 is a flowchart describing the seventh operation example of a communication system between vehicles.

Subsequently will be described a seventh operation example of the communication system 1 between vehicles. FIG. 24 is a state illustration drawing illustrating the seventh operation example of the communication system 1 between vehicles. FIG. 25 is a flowchart describing the seventh operation example of the communication system 1.

The seventh operation example is applied, as shown in FIG. 24, to a case that the vehicle C4 of a large vehicle such as a truck is driving in front on a same lane as the vehicle C2.

Firstly, in a case (Yes in a step S141) that the search start determination unit 54 determines that the vehicle C4 is driving before the vehicle C2, the information sharing vehicle decision unit 57 decides the vehicles C2, C4 as an information sharing vehicle.

Then in a case (Yes in a step S142) that there exists the moving body M in the vicinity of the vehicle C4, the object detection unit 32 of the vehicle C4 detects (step S143) the moving body M, and the object data notification unit 34 of the vehicle C4 notifies (step S144) the in-vehicle apparatus 2 of the vehicle C2 of moving body data with respect to the moving body M.

Then the display device 20 of the vehicle C2 displays (step S145) the moving body (other moving body) M.

<Eighth Operation Example of Communication System between Vehicles>

Subsequently will be described an eighth operation example of the communication system 1 between vehicles. The eighth operation example can be performed in combination with any of the fifth to seventh operation examples, and also independently performed in the same states as in the fifth to seventh operation examples. Here will be described the eighth operation example, taking it as an example a case that the eighth operation example is independently performed in the same state as in the fifth operation example.

Figure 26:
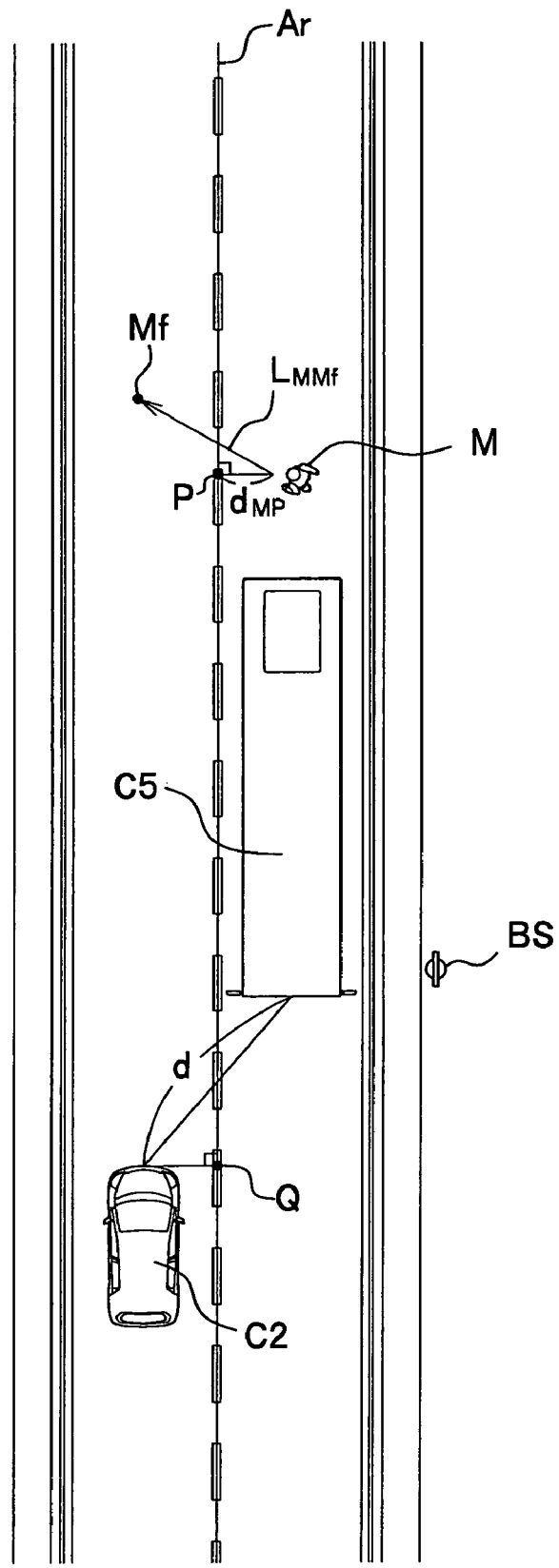
FIG. 26 is a state illustration drawing illustrating an eighth operation example of a communication system between vehicles.
Figure 27:
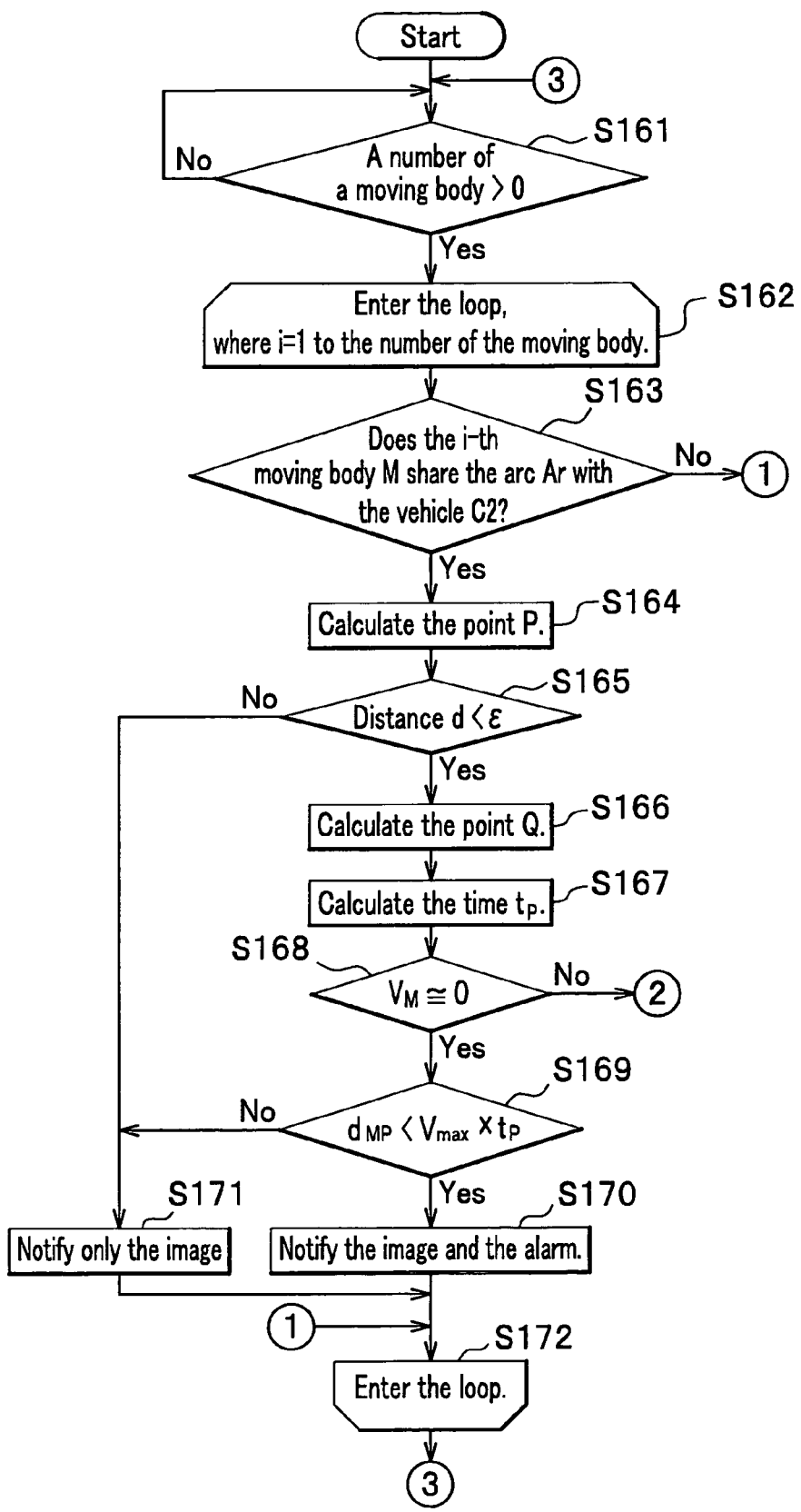
FIG. 27 is a flowchart describing the eighth operation example of an communication system between vehicles.
Figure 28:
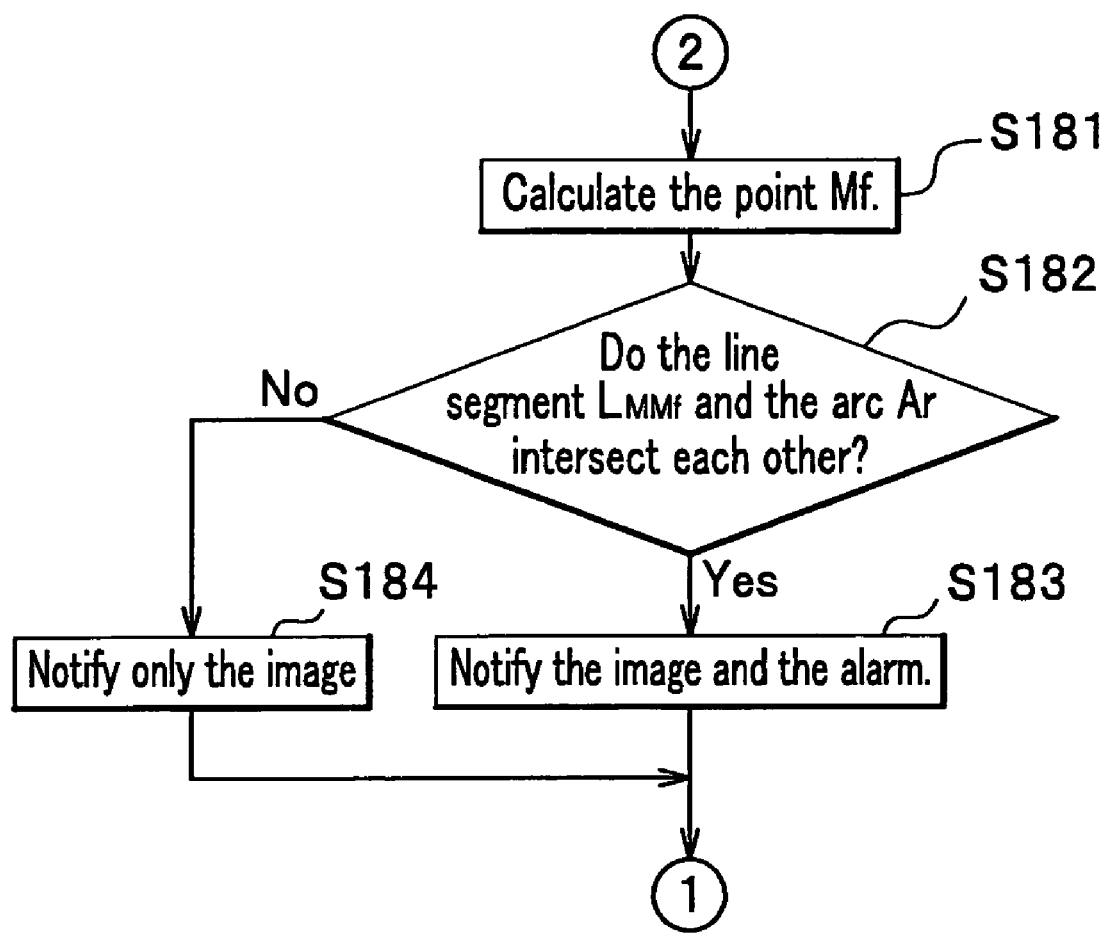
FIG. 28 is a flowchart describing the eighth operation example of the communication system between the vehicles.

FIG. 26 is a state illustration drawing illustrating the eighth operation example of the communication system 1 between vehicles. FIGS. 27 and 28 are flowcharts describing the eighth operation example of the communication system 1.

Meanwhile, in FIG. 26 is omitted an image taken area of each vehicle. In addition, in map data memorized in the memory units 23, 62, at center of a road is set an arc Ar for connecting each node N, and the communication system 1 uses the arc Ar.

Firstly, in a case that the object detection unit 32 of the vehicle C4 detects (Yes in a step S161) the moving body M, the information sharing vehicle decision unit 57 decides an information sharing vehicle out of vehicles C extracted by the vicinity vehicle extraction unit 55. Then a communication is performed between the vehicles C2, C5 decided as the information sharing vehicle. Here, various pieces of data of the vehicle C5 and those of the moving body M are transmitted to the in-vehicle apparatus 2 of the vehicle C2 from that of the vehicle C5. Then the in-vehicle apparatus 2 of the vehicle C2 enters a loop of performing processing of steps S162 to S172 by number "i" of detected moving-body M. Meanwhile, in FIG. 26 is shown only one moving body M.

Then in a case (Yes in the step S163) that an i-th moving body M shares the arc Ar with the vehicle C2, the encounter determination unit 40 of the vehicle C2 calculates (step S164) a position of a point P where a current position of the i-th moving body M and the arc Ar orthogonalize. Meanwhile, in a case of No in the step S163, the processing moves to that of the next moving body M.

Then in a case (Yes in the step S165) that a distance d between the vehicles C2, C5 is shorter than a predetermined distance $\epsilon$ (for example, $\epsilon$=50 m), the encounter determination unit 40 of an i-th vehicle C2 calculates (step S166) a position of a point Q where the i-th vehicle C2 and the arc Ar orthogonalize.

Then the encounter determination unit 40 of the vehicle C2 calculates (step S167) a time $t_p$ requested for the vehicle C2 to reach the point P. The time $t_p$ is calculated by an equation (3) below:

$$t_p = |Q-P|/V_{C2} - \alpha, \quad (3)$$

(where $\alpha$ is a margin; considering a case of the vehicle C2 accelerating, it is assumed that the vehicle C2 reaches the point P a little earlier).

Then in a case (Yes in the step S168) that the moving speed $V_M$ of the i-th moving body M is nearly zero (for example, not more than 2 km/hr), the encounter determination unit 40 determines (step S169) whether or not a distance $d_{MP}$ between a current position of the moving body M and the point P satisfies a condition equation (4):

$$d_{MP} = V\text{max} \times t_p, \quad (4)$$

(Vmax is a maximum speed of the moving body M and is memorized in advance in the memory unit 23 for every kind thereof).

In a case (Yes in the step S169) that the distance $d_{MP}$ satisfies the condition equation (4), the image data generation unit 41*a* generates image data for displaying the moving body M, and the voice data generation unit 41*d* generates voice data for informing alarms (a deceleration instruction, a slower driving instruction, and the like) based on a possibility of an encounter with the moving body M. These pieces of data are notified (step S170) to a driver via the display device 20 and the speaker 21.

In a case (No in the step S169) that the distance $d_{MP}$ does not satisfy the condition equation (4), the image data generation unit 41*a* generates image data for displaying the moving body M. The image data is notified (step S171) to the driver via the display device 20.

In addition, in a case of No in the step S168, the encounter determination unit 40 calculates (step S181) a point Mf of a future position of the moving body M. The calculation of the point Mf is performed by repeating a position estimation of the moving body M, for example, by Kalman filter by $t_p/\Delta t$ times (here, $\Delta t$ is a calculation cycle time of the Kalman filter).

Then the encounter determination unit 40 determines (step S182) whether or not a line segment $L_{MMf}$ and the arc Ar connecting the points M, Mf intersect.

In a case of Yes in the step S182, the image data generation unit 41*a* generates image data for displaying the moving body M, and the voice data generation unit 41*d* generates voice data for informing alarms (a deceleration instruction, a slow-down instruction, and the like) based on a possibility of an encounter with the moving body M. These pieces of data are notified (step S183) to a driver via the display device 20 and the speaker 21.

In a case of No in the step S182, the image data generation unit 41*a* generates image data for displaying the moving body M. The image data is notified (step S184) to the driver via the display device 20 and the speaker 21.

Reasons why the processing thereafter is thus changed according to the values of the moving speed $V_M$ of the moving body M are as follows:

In a case that the moving speed $V_M$ of the moving body M is nearly zero, it is difficult to estimate a movement of the moving body M after then. Therefore, the in-vehicle apparatus 2 of the vehicle C2 performs processing, assuming that the moving body M moves at a maximum speed in a direction where it encounters the vehicle C2.

In a case that the moving speed $V_M$ of the moving body M is large to some extent, it is easy to estimate a movement of the moving body M after then. Therefore, the in-vehicle apparatus 2 of the vehicle C2 performs processing, using such an assumption.

Meanwhile, in the steps S170, S171, S183, and S184 the in-vehicle apparatus 2 can also use a notification to a driver by character information.

In addition, in a case that there exists vehicles C following the vehicle C2, it is also enabled to perform the above processing for every information sharing vehicle decided by the information sharing vehicle decision unit 57 of the vehicle control apparatus 3.

Meanwhile, in a case of independently performing the eight operation example, compared to a case of performing it in combination with any of the fifth to seventh operation examples, it suffices to extract a vicinity vehicle only in a case of having detected the moving body M; thus it is enabled to enhance a processing speed of the communication system 1.

Thus, although the embodiment of the present invention is described, the invention is not limited thereto and various variations are available without departing from the spirit and scope of the invention.

For example, the vehicle control apparatus 3 may also be a configuration comprising the encounter determination unit 40.

In addition, a configuration is available where part or all of the configuration of the vehicle control apparatus 3 is built in the in-vehicle apparatus 2 of each vehicle C; another configuration is available where part or all of the configuration of the main control unit 30 of the in-vehicle apparatus 2 is built in the vehicle control apparatus 3. In addition, the vehicle position detection device is not limited to the GPS receiver 14. In addition, each of various pieces of data can be replaced with data of a physical quantity having a meaning equal thereto.

In addition, a setting of an image taken area and a width of the vicinity vehicle extraction area EA can be appropriately set.

In addition, instead an image of the moving body M is also available a configuration of displaying a mark and a combination (composite) image representing the moving body M in the display device 20.

In addition, configurations are available: not only a configuration of combining a moving body image taken by a camera of other vehicle with an image taken by a camera of a vehicle in question; but also a configuration of combining a moving body image taken by a camera of other vehicle with a map image by a car navigation system thereof.

In addition, a configuration is also available that the image data generation unit 41*a* generates image data for displaying a determination result of the encounter determination unit 40 and outputs it. Furthermore, a configuration is also available that the character data generation unit 41*b* and the image data generation unit 41*a* generate character data and image data for displaying an encounter determination result and informing a driver of the result by character and image.

In addition, an estimation (conversion to current data) of various pieces of data by the local map generation unit 39 and the like can be appropriately set.

What is claimed is:

1. A communication system between vehicles for communicating with each other, the system comprising in each of the vehicles:
    an image taking device for taking an image around the vehicle;
    a moving body detection unit for detecting a moving body from the image taken by said image taking device;
    a display unit for displaying the image;
    an image data generation unit for generating image data output to said display unit of said vehicle;
    a transmitting/receiving device for any of transmitting and receiving data; and
    a moving body position data generation unit for generating moving body position data with respect to a position of said moving body from an image taken by said image taking device,
    wherein said image data generation unit generates image data for displaying an existence of said moving body, of which an image is taken by said image taking device of one of the vehicles, and outputs the image data to said display unit of other vehicle.

2. A communication system between vehicles for communicating with each other, the system comprising in each of the vehicles:

an image taking device for taking an image around the vehicle;

a moving body detection unit for detecting a moving body from the image taken by said image taking device;

a display unit for displaying the image;

an image data generation unit for generating image data output to said display unit of said vehicle; and a transmitting/receiving device for any of transmitting and receiving data, a vehicle position detection device for detecting vehicle position data with respect to said vehicle; and a moving body position data generation unit for generating moving body position data with respect to a position of said moving body from an image taken by said image taking device, wherein said image data generation unit generates image data for displaying an existence of said moving body, of which an image is taken by said image taking device of one of the vehicles, and outputs the image data to said display unit of other vehicle, and wherein based on said moving body position data, said image data generation unit generates image data for displaying an existence of said moving body, of which an image is taken by said image taking device of one vehicle at a corresponding position, and outputs the image data to said display unit of other vehicle.

3. The communication system according to claim 2, wherein said image data generation unit compensates an image of said moving body so as to match a combined surrounding image, and based on said vehicle position data and said moving body position data, generates image data for displaying the compensated image of said moving body at a corresponding position, and outputs the image data to said display unit of other vehicle.

4. The communication system according to claim 2, wherein said image data generation unit generates image data for displaying a compensated image of said moving body at a corresponding position in an image taken by said image taking device of other vehicle and outputs the image data to said display unit of said other vehicle.

5. The communication system according to claim 2 further comprising an information sharing vehicle decision unit for deciding a combination of an information sharing vehicle.

6. The communication system according to claim 3 further comprising an information sharing vehicle decision unit for deciding a combination of an information sharing vehicle.

7. The communication system according to claim 4 further comprising an information sharing vehicle decision unit for deciding a combination of an information sharing vehicle.

8. The communication system according to claim 5, wherein said information sharing vehicle decision unit combines each vehicle of which an image taken area is overlapped, based on said image taken area by said image taking device.

9. The communication system according to claim 6, wherein said information sharing vehicle decision unit combines each vehicle of which an image taken area is overlapped, based on said image taken area by said image taking device.

10. The communication system according to claim 7, wherein said information sharing vehicle decision unit combines each vehicle of which an image taken area is overlapped, based on said image taken area by said image taking device.

11. The communication system according to claim 5 further comprising a search start determination unit for determining whether or not to start searching an information sharing vehicle, wherein when said search start determination unit determines to start searching the information sharing vehicle, said information sharing vehicle decision unit determines a combination of the information sharing vehicle.

12. The communication system according to claim 6 further comprising a search start determination unit for determining whether or not to start searching an information sharing vehicle, wherein when said search start determination unit determines to start searching the information sharing vehicle, said information sharing vehicle decision unit determines a combination of the information sharing vehicle.

13. The communication system according to claim 7 further comprising a search start determination unit for determining whether or not to start searching an information sharing vehicle, wherein when said search start determination unit determines to start searching the information sharing vehicle, said information sharing vehicle decision unit determines a combination of the information sharing vehicle.

14. The communication system according to claim 8 further comprising a search start determination unit for determining whether or not to start searching an information sharing vehicle, wherein when said search start determination unit determines to start searching the information sharing vehicle, said information sharing vehicle decision unit determines a combination of the information sharing vehicle.

15. The communication system according to claim 9 further comprising a search start determination unit for determining whether or not to start searching an information sharing vehicle, wherein when said search start determination unit determines to start searching the information sharing vehicle, said information sharing vehicle decision unit determines a combination of the information sharing vehicle.

16. The communication system according to claim 10 further comprising a search start determination unit for determining whether or not to start searching an information sharing vehicle, wherein when said search start determination unit determines to start searching the information sharing vehicle, said information sharing vehicle decision unit determines a combination of the information sharing vehicle.

17. The communication system according to claim 11, wherein when said moving body detection unit of said vehicle detects a moving body, said search start determination unit determines whether or not to start searching an information sharing vehicle with the vehicle, and wherein when said search start determination unit determines to start searching the information sharing vehicle with the vehicle, said information sharing vehicle decision unit determines the information sharing vehicle with the vehicle.

18. The communication system according to claim 12, wherein when said moving body detection unit of said vehicle detects a moving body, said search start determination unit determines whether or not to start searching an information sharing vehicle with the vehicle, and wherein when said search start determination unit determines to start searching the information sharing vehicle with the vehicle, said information sharing vehicle decision unit determines the information sharing vehicle with the vehicle.

19. The communication system according to claim 13, wherein when said moving body detection unit of said vehicle detects a moving body, said search start determination unit determines whether or not to start searching an information sharing vehicle with the vehicle, and wherein when said search start determination unit determines to start searching the information sharing vehicle with the vehicle, said information sharing vehicle decision unit determines the information sharing vehicle with the vehicle.

20. The communication system according to claim 14, wherein when said moving body detection unit of said vehicle detects a moving body, said search start determination unit determines whether or not to start searching an information sharing vehicle with the vehicle, and wherein when said search start determination unit determines to start searching the information sharing vehicle with the vehicle, said information sharing vehicle decision unit determines the information sharing vehicle with the vehicle.

21. The communication system according to claim 15, wherein when said moving body detection unit of said vehicle detects a moving body, said search start determination unit determines whether or not to start searching an information sharing vehicle with the vehicle, and wherein when said search start determination unit determines to start searching the information sharing vehicle with the vehicle, said information sharing vehicle decision unit determines the information sharing vehicle with the vehicle.

22. The communication system according to claim 16, wherein when said moving body detection unit of said vehicle detects a moving body, said search start determination unit determines whether or not to start searching an information sharing vehicle with the vehicle, and wherein when said search start determination unit determines to start searching the information sharing vehicle with the vehicle, said information sharing vehicle decision unit determines the information sharing vehicle with the vehicle.

23. The communication system according to claim 17 further comprising a memory unit for memorizing map data, wherein said search start determination unit determines whether or not said vehicle is approaching a node in said map data, based on said vehicle position data and said map data, and wherein when said search start determination unit determines that said vehicle is approaching said node in said map data, said information sharing vehicle decision unit decides an information sharing vehicle with the vehicle.

24. The communication system according to claim 18 further comprising a memory unit for memorizing map data, wherein said search start determination unit determines whether or not said vehicle is approaching a node in said map data, based on said vehicle position data and said map data, and wherein when said search start determination unit determines that said vehicle is approaching said node in said map data, said information sharing vehicle decision unit decides an information sharing vehicle with the vehicle.

25. The communication system according to claim 19 further comprising a memory unit for memorizing map data, wherein said search start determination unit determines whether or not said vehicle is approaching a node in said map data, based on said vehicle position data and said map data, and wherein when said search start determination unit determines that said vehicle is approaching said node in said map data, said information sharing vehicle decision unit decides an information sharing vehicle with the vehicle.

26. The communication system according to claim 20 further comprising a memory unit for memorizing map data, wherein said search start determination unit determines whether or not said vehicle is approaching a node in said map data, based on said vehicle position data and said map data, and wherein when said search start determination unit determines that said vehicle is approaching said node in said map data, said information sharing vehicle decision unit decides an information sharing vehicle with the vehicle.

27. The communication system according to claim 21 further comprising a memory unit for memorizing map data, wherein said search start determination unit determines whether or not said vehicle is approaching a node in said map data, based on said vehicle position data and said map data, and wherein when said search start determination unit determines that said vehicle is approaching said node in said map data, said information sharing vehicle decision unit decides an information sharing vehicle with the vehicle.

28. The communication system according to claim 22 further comprising a memory unit for memorizing map data, wherein said search start determination unit determines whether or not said vehicle is approaching a node in said map data, based on said vehicle position data and said map data, and wherein when said search start determination unit determines that said vehicle is approaching said node in said map data, said information sharing vehicle decision unit decides an information sharing vehicle with the vehicle.

29. The communication system according to claim 23 further comprising a vicinity vehicle extraction unit for extracting a vehicle positioned in a vicinity of said vehicle, wherein said information sharing vehicle decision unit decides an information sharing vehicle out of a vehicle extracted by said vicinity vehicle extraction unit.

30. The communication system according to claim 24 further comprising a vicinity vehicle extraction unit for extracting a vehicle positioned in a vicinity of said vehicle, wherein said information sharing vehicle decision unit decides an information sharing vehicle out of a vehicle extracted by said vicinity vehicle extraction unit.

31. The communication system according to claim 25 further comprising a vicinity vehicle extraction unit for extracting a vehicle positioned in a vicinity of said vehicle, wherein said information sharing vehicle decision unit decides an information sharing vehicle out of a vehicle extracted by said vicinity vehicle extraction unit.

32. The communication system according to claim 26 further comprising a vicinity vehicle extraction unit for extracting a vehicle positioned in a vicinity of said vehicle, wherein said information sharing vehicle decision unit decides an information sharing vehicle out of a vehicle extracted by said vicinity vehicle extraction unit.

33. The communication system according to claim 27 further comprising a vicinity vehicle extraction unit for extracting a vehicle positioned in a vicinity of said vehicle, wherein said information sharing vehicle decision unit decides an information sharing vehicle out of a vehicle extracted by said vicinity vehicle extraction unit.

34. The communication system according to claim 28 further comprising a vicinity vehicle extraction unit for extracting a vehicle positioned in a vicinity of said vehicle, wherein said information sharing vehicle decision unit decides an information sharing vehicle out of a vehicle extracted by said vicinity vehicle extraction unit.

35. A communication system between vehicles for communicating with each other, the system comprising in each of the vehicles:
an image taking device for taking an image around the vehicle;
a moving body detection unit for detecting a moving body from the image taken by said image taking device;
a display unit for displaying the image;
an image data generation unit for generating image data output to said display unit of said vehicle;
a transmitting/receiving device for any of transmitting and receiving data, wherein said image data generation unit generates image data for displaying an existence of said moving body, of which an image is taken by said image taking device of one of the vehicles, and outputs the image data to said display unit of other vehicle;
a sounding device for sounding a voice; and a voice data generation unit for generating voice data with respect to the voice made to be sounded by said sounding device of said vehicle, wherein said voice data generation unit generates the voice data for informing an existence of a moving body from an image taken by said image taking device of one vehicle and outputs the voice data to said sounding device of other vehicle.

36. The communication system according to claim 35 further comprising an information sharing vehicle decision unit for deciding a combination of an information sharing vehicle, wherein said information sharing vehicle decision unit combines each vehicle of which an image taken area is overlapped, based on said image taken area by said image taking device.

37. The communication system according to claim 35 further comprising a search start determination unit for determining whether or not to start searching an information sharing vehicle, wherein when said search start determination unit determines to start searching the information sharing vehicle, said information sharing vehicle decision unit decides a combination of the information sharing vehicle, and wherein when said moving body detection unit of said vehicle detects a moving body, said search start determination unit determines whether or not to start searching the information sharing vehicle with the vehicle, and wherein when said search start determination unit determines to start searching the information sharing vehicle with the vehicle, said information sharing vehicle decision unit decides the information sharing vehicle with the vehicle.

38. The communication system according to claim 35 further comprising:

a memory unit for memorizing map data; and a vicinity vehicle extraction unit for extracting a vehicle positioned in a vicinity of the vehicle, wherein said search start determination unit determines whether or not the vehicle is approaching a node in said map data, based on said vehicle position data and said map data, and wherein when said search start determination unit determines that said vehicle is approaching said node, said information sharing vehicle decision unit determines an information sharing vehicle with the vehicle and decides the information sharing vehicle out of a vehicle extracted by said vicinity vehicle extraction unit.

39. A communication system between vehicles for communicating with each other, the system comprising in each of the vehicles:

an image taking device for taking an image around the vehicle;

a moving body detection unit for detecting a moving body from the image taken by said image taking device;

a display unit for displaying the image;

an image data generation unit for generating image data output to said display unit of said vehicle;

a transmitting/receiving device for any of transmitting and receiving data, wherein said image data generation unit generates image data for displaying an existence of said moving body, of which an image is taken by said image taking device of one of the vehicles, and outputs the image data to said display unit of other vehicle;

an image/character data generation unit for generating any of image and character data output to said display unit of said vehicle;

an encounter determination unit for determining whether or not a moving body, which is detected by said moving body detection unit of one vehicle, and other vehicle encounter;

a vehicle position data detection device for detecting vehicle position data with respect to a position of said vehicle; and a moving body position data generation unit for generating moving body position data with respect to a position of said moving body from an image taken by said image taking device, wherein said image/character data generation unit generates any of the image and character data for informing a determination result generated by said encounter determination unit and outputs any of the image and character data to said display unit of the other vehicle, and wherein said encounter determination unit determines the encounter, based on said vehicle position data detected by said vehicle position data detection device and said moving body position data generated by said moving body position data generation unit.

40. The communication system according to claim 39 further comprising an information sharing vehicle decision unit for deciding a combination of an information sharing vehicle, wherein said information sharing vehicle decision unit combines each vehicle of which an image taken area is overlapped, based on the image taking area of said image taking device.

41. The communication system according to claim 39 further comprising a search start determination unit for determining whether or not to start searching an information sharing vehicle; wherein when said search start determination unit determines to start searching the information sharing vehicle, said information sharing vehicle decision unit decides a combination of the information sharing vehicle; wherein when said moving body detection unit of said vehicle detects a moving body, said search start determination unit determines whether or not to start searching the information sharing vehicle with the vehicle; and wherein when said search start determination unit determines to start searching the information sharing vehicle with the vehicle, said information sharing vehicle decision unit decides the information sharing vehicle with the vehicle.

42. The communication system according to claim 39 further comprising:

a memory unit for memorizing map data; and a vicinity vehicle extraction unit for extracting a vehicle positioned in a vicinity of said vehicle, wherein said search start determination unit determines whether or not said vehicle is approaching a node in said map data, and wherein when said search start determination unit determines that said vehicle is approaching said node, said information sharing vehicle decision unit decides an information sharing vehicle with the vehicle out of a vehicle extracted by said vicinity vehicle extraction unit.

43. The communication system according to claim 41 further comprising a memory unit for memorizing a relationship between a vehicle speed and a stop distance, wherein said search start determination unit determines to start searching, based on said stop distance according to said vehicle speed.

44. The communication system according to claim 42 further comprising a memory unit for memorizing a relationship between a vehicle speed and a stop distance, wherein said search start determination unit determines to start searching, based on said stop distance according to said vehicle speed.

45. The communication system according to claim 43, wherein said stop distance is compensated, based on a driving environment.

46. The communication system according to claim 44, wherein said stop distance is compensated, based on a driving environment.

47. The communication system according to claim 35 further comprising:
- an encounter determination unit for determines whether or not a moving body, which is detected by said moving body detection unit of one vehicle, and other vehicle encounter,
- wherein said voice data generates voice data for informing a determination result generated by said encounter determination unit and outputs the voice data to said sounding device of other vehicle, and said encounter determination unit determines the encounter, based on vehicle position data detected by said vehicle position data detection device and said moving body position data generated by said moving body position data generation unit.

48. The communication system according to claim 47 further comprising an information sharing vehicle decision unit for determining a combination of an information sharing vehicle, wherein said information sharing vehicle decision unit combines each vehicle of which an image taken area is overlapped, based on the image taken area by said image taking device.

49. The communication system according to claim 47 further comprising a search start determination unit for determining whether or not to start searching an information sharing vehicle; wherein when said search start determination unit determines to start searching the information sharing vehicle, said information sharing vehicle decision unit decides a combination of the information sharing vehicle; wherein when said moving body detection unit of the vehicles detects a moving body, the search start determination unit determines whether or not to start searching the information sharing vehicle with the vehicle; and wherein when said search start determination unit determines to start searching the information sharing vehicle with the vehicle, said information sharing vehicle decision unit decides the information sharing vehicle with the vehicle.

50. The communication system according to claim 47 further comprising:
- a memory unit for memorizing map data; and
- a vicinity vehicle extraction unit for extracting a vehicle positioned in a vicinity of said vehicle,
  - wherein said search start determination unit determines whether or not said vehicle is approaching a node in said map data, based on said vehicle position data and said map data, and
  - wherein when said search start determination unit determines that said vehicle is approaching said node, said information sharing vehicle decision unit decides an information sharing vehicle out of a vehicle extracted by said vicinity vehicle extraction unit.

51. The communication system according to claim 49 further comprising a memory unit for memorizing a relationship between a vehicle speed and a stop distance, wherein said search start determination unit determines to start searching, based on said stop distance according to said vehicle speed.

52. The communication system according to claim 50 further comprising a memory unit for memorizing a relationship between a vehicle speed and a stop distance, wherein said search start determination unit determines to start searching, based on said stop distance according to said vehicle speed.

53. The communication system according to claim 51, wherein said stop distance is compensated, based on a driving environment.

54. The communication system according to claim 52, wherein said stop distance is compensated, based on a driving environment.

* * * * *